US007533013B2

(12) United States Patent
Marcu

(10) Patent No.: US 7,533,013 B2
(45) Date of Patent: May 12, 2009

(54) MACHINE TRANSLATION TECHNIQUES

(75) Inventor: Daniel Marcu, Culver City, CA (US)

(73) Assignee: University of Southern California, Los Angeles, CA (US)

( * ) Notice: Subject to any disclaimer, the term of this patent is extended or adjusted under 35 U.S.C. 154(b) by 877 days.

(21) Appl. No.: 09/854,327

(22) Filed: May 11, 2001

(65) Prior Publication Data

US 2002/0040292 A1  Apr. 4, 2002

Related U.S. Application Data

(60) Provisional application No. 60/203,643, filed on May 11, 2000.

(51) Int. Cl.
*G06F 17/28* (2006.01)
(52) U.S. Cl. .................. 704/2; 704/4; 704/5; 704/7; 704/8
(58) Field of Classification Search ............ 704/2–8; 715/264

See application file for complete search history.

(56) References Cited

U.S. PATENT DOCUMENTS

| 4,787,038 A * | 11/1988 | Doi et al. ................. 704/2 |
| 4,814,987 A * | 3/1989 | Miyao et al. ............... 704/3 |
| 5,311,429 A * | 5/1994 | Tominaga .................. 704/10 |
| 5,477,451 A | 12/1995 | Brown et al. |
| 5,510,981 A * | 4/1996 | Berger et al. .............. 704/2 |
| 5,644,774 A * | 7/1997 | Fukumochi et al. .......... 704/4 |
| 5,761,631 A | 6/1998 | Nasukawa |
| 5,805,832 A | 9/1998 | Brown et al. |
| 5,867,811 A * | 2/1999 | O'Donoghue ............... 704/1 |
| 5,903,858 A | 5/1999 | Saraki |

(Continued)

FOREIGN PATENT DOCUMENTS

EP  0469884 A2  2/1992

(Continued)

OTHER PUBLICATIONS

Sumita et al., "A discourse structure analyzer for Japanese text," *Proceedings of the International Conference on Fifth Generation Computer Systems*, vol. 2, pp. 1133-1140 (1992).

(Continued)

*Primary Examiner*—Patrick N Edouard
*Assistant Examiner*—Lamont M Spooner
(74) *Attorney, Agent, or Firm*—Carr & Ferrell LLP

(57) ABSTRACT

Machine translation decoding is accomplished by receiving as input a text segment in a source language to be translated into a target language, generating an initial translation as a current target language translation, applying one or more modification operators to the current target language translation to generate one or more modified target language translations, determining whether one or more of the modified target language translations represents an improved translation in comparison with the current target language translation, setting a modified target language translation as the current target language translation, and repeating these steps until occurrence of a termination condition. Automatically generating a tree (e.g., either a syntactic tree or a discourse tree) can be accomplished by receiving as input a tree corresponding to a source language text segment, and applying one or more decision rules to the received input to generate a tree corresponding to a target language text segment.

33 Claims, 14 Drawing Sheets

U.S. PATENT DOCUMENTS

| | | | |
|---|---|---|---|
| 5,991,710 A | | 11/1999 | Papineni et al. |
| 6,092,034 A * | | 7/2000 | McCarley et al. ............... 704/2 |
| 6,205,456 B1 | | 3/2001 | Nakao |
| 6,236,958 B1 * | | 5/2001 | Lange et al. ................... 704/8 |
| 6,289,302 B1 * | | 9/2001 | Kuo ............................... 704/2 |
| 6,304,841 B1 * | | 10/2001 | Berger et al. ................... 704/2 |
| 6,360,196 B1 * | | 3/2002 | Poznanski et al. ............... 704/8 |
| 6,389,387 B1 * | | 5/2002 | Poznanski et al. ............... 704/9 |
| 6,393,389 B1 * | | 5/2002 | Chanod et al. ................. 704/7 |

FOREIGN PATENT DOCUMENTS

| | | |
|---|---|---|
| EP | 0715265 A2 | 6/1996 |
| EP | 0933712 A2 | 8/1999 |

OTHER PUBLICATIONS

Kurohashi et al., "Automatic detectionof discourse structure by checking surface information in sentences," *proceedings of COLING '94*, vol. 2, pp. 1123-1127 (1994).

Marcu, "The rhetorical parsing of natural language texts," *Proceedings of ACL/EACL '97*, pp. 96-103 (1997).

Corston-Oliver, "Beyond string matching and cue phrases: Improving efficiency and coverage in discourse analysis," *The AAAI Spring Symposium on Intelligent Text Summarization*, pp. 9-15 (1998).

Miike et al., "A full-text retrieval system with a dynamic abstract generation function," *Proceedings of SI-GIR '94*, pp. 152-161 (1994).

Marcu, "Discourse trees are good indicators of importance in text," *Advances in Automatic Text Summarization*, The MIT Press (1999).

Marcu, "Instructions for Manually Annotating the Discourse Structures of Texts", Discourse Annotation, pp. 1-49, May 18, 1999.

Marcu, "The Rhetorical Parsing, Summarization, and Generation of Natural Language Texts", Ph.D. Thesis, University of Toronto (1998).

Brown et al., "The Mathematics of Statistical machine Translation: Parameter Estimation", *Computational Linguistics*, vol. 19, No. 2, pp. 263-311 (Jun. 1993).

Jelinek, "Fast Sequential Decoding Algorithm Using a Stack", *IBM J. Res. Develop.*, vol. 13, No. 6, pp. 675-685, Nov. 1969.

Knight, "Decoding Complexity in Word-Replacement Translation Models", *Computational Linguistics*, vol. 25, No. 4, pp. 607-615 (Dec. 1999).

Monasson et al., "Determining computational complexity from characteristic 'phase transitions'", *Nature*, vol. 400, pp. 133-137 (Jul. 1999).

Selman et al., "A New Method for Solving Hard Satisfiability Problems", *Proceedings of the Tenth National Conference on Artificial Intelligence*, pp. 440-446 (Jul. 1992).

Tillmann et al., "A DP based Search Using Monotone Alignments in Statistical Translation", in *Proc. ACL*, pp. 289-296 (1997).

Wang et al., "Decoding Algorithm in Statistical Machine Translation", in *Proc. ACL*, pp. 366-372 (1996).

Wu et al., A Polynomial-Time Algorithm for Statistical Machine Translation, in *Proc. ACL*, pp. 152-158 (1996).

Marcu, "Building Up Rhetorical Structure Trees", Proceedings of the National Convference on Artificial Intelligence and Innovative Applications of Artificial Intelligence Conference, vol. 2, Aug. 4, 1996, pp. 1069-1074.

Witbrock, et al., "Ultra-summarization: A Statistical Approach to Generating Highly Condensed Non-Extractive Summaries", *Proceedings of SGIR '99, 22nd International Conference on Research and Development in Information Retrieval, Proceedings of 22nd International ACM SIGIR Conference on Research and Development in Infromation Retrieval*, Berkeley, CA, USA, Aug. 1999, pp. 315-316.

\* cited by examiner

ITERATION 1 ce ne est pas juste.
that is not fair.
Aprob = 1.13162e-22   LMprob = 2.98457e-14  TMprob = 3.79156e-09

ITERATION 2

Change not -> ne to is -> ne ce ne est pas juste.
that is is not fair.
Aprob = 9.95934e-19   LMprob = 8.65626e-10  TMprob = 1.15054e-09

ITERATION 3

Increase fertility. Change is -> est to is -> est ce ne est pas juste.
that is not fair.
Aprob = 2.65104e-16   LMprob = 5.05036e-06  TMprob = 5.24921e-11

ITERATION 4

Change that -> ce to it -> ce ce ne est pas juste.
it is not fair.
Aprob = 3.82599e-16   LMprob = 6.63863e-06  TMprob = 5.76322e-11

*FIG. 4*

| sent length | decoder type | time (sec/sent) | translation errors (semantic and/or syntactic) |
|---|---|---|---|
| 6 | stack | 13.72 | 42 |
| 6 | greedy | 1.58 | 46 |
| 6 | greedy* | 0.07 | 46 |
| 8 | stack | 45.45 | 59 |
| 8 | greedy | 2.75 | 68 |
| 8 | greedy* | 0.15 | 69 |
| 10 | stack | 105.15 | 57 |
| 10 | greedy | 3.83 | 63 |
| 10 | greedy* | 0.20 | 68 |
| 15 | stack | >2000 | 74 |
| 15 | greedy | 12.06 | 75 |
| 15 | greedy* | 1.11 | 75 |
| 15 | greedy$^1$ | 0.63 | 76 |
| 20 | greedy | 49.23 | 86 |
| 20 | greedy* | 11.34 | 93 |
| 20 | greedy$^1$ | 0.94 | 93 |

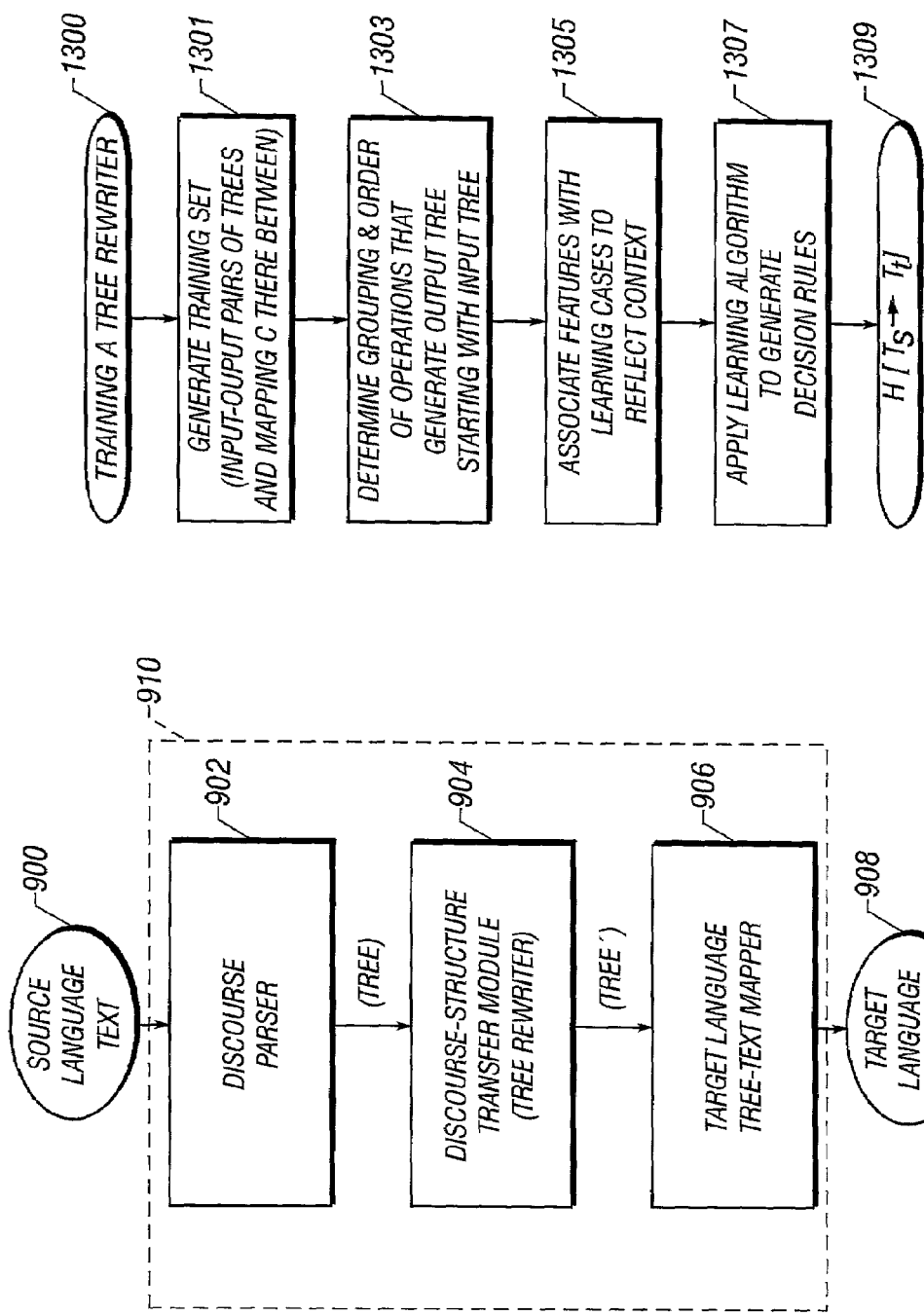

MACHINE TRANSLATION TECHNIQUES

RELATED APPLICATION

This application claims the benefit of, and incorporates herein, U.S. Provisional Patent Application No. 60/203,643, filed May 11, 2000.

ORIGIN OF INVENTION

The research and development described in this application were supported by the NSA under grant number MDA904-97-0262 and by DARPA/ITO under grant number MDA904-99-C-2535. The US government may have certain rights in the claimed inventions.

FIELD OF THE INVENTION

The present application relates to computational linguistics and more particularly to machine translation techniques. More specifically, the present application describes techniques for performing decoding of a source text segment into a target text segment and for rewriting trees from a first linguistic space into another linguistic space.

BACKGROUND AND SUMMARY

Machine translation (MT) is the automatic translation, for example, using a computer system, from a first language (e.g., French) into another language (e.g., English). Systems that perform MT techniques are said to "decode" the source language into the target language. From the end-user's perspective, the MT process is relatively straight-forward. As shown in FIG. 1A, the MT 102 receives as input a source sentence 100, for example, in French (e.g., "ce ne est pas juste"), and after processing the input sentence, outputs the equivalent decoded sentence in the target language—in this example, English ("it is not fair").

One type of conventional MT decoder is the "stack decoder" such as described in U.S. Pat. No. 5,477,451 (Brown et al.), entitled "Method and System for Natural Language Translation." In a stack decoder, the universe of possible translations are organized into a graph structure and then exhaustively searched until an optimal solution (translation) is found. Although stack decoders tend to produce good results, they do so at a significant cost—namely, maintaining and searching a large potential solution space such as used by stack decoders is expensive, both computationally and space-wise (e.g., in terms of computer memory). Accordingly, the present inventor recognized that an iterative, incremental decoding technique could produce optimal, or near optimal, results while considerably reducing the computational and space requirements. This decoder is referred to herein as a "greedy" decoder or, equivalently, as a "fast decoder." The term "greedy" refers to techniques that produce solutions based on myopic optimization—that is, given a partial solution, produce as a next estimate a new solution that improves the objective the most. Put another way, a greedy algorithm typically starts out with an approximate solution and then tries to improve it incrementally until a satisfactory solution is reached.

Implementations of the greedy decoder may include various combinations of the following features.

In one aspect, machine translation (MT) decoding involves receiving as input a text segment (e.g., a clause, a sentence, a paragraph or a treatise) in a source language to be translated into a target language, generating an initial translation (e.g., either a word-for-word or phrase-for-phrase gloss) as a current target language translation, applying one or more modification operators to the current target language translation to generate one or more modified target language translations, determining whether one or more of the modified target language translations represents an improved translation in comparison with the current target language translation, setting a modified target language translation as the current target language translation, and repeating these steps until occurrence of a termination condition.

Applying one or more modification operators may involve changing the translation of one or two words in the current target language translation the translation. Alternatively, or in addition, applying one or more modification operators may include (i) changing a translation of a word in the current target language translation and concurrently (ii) inserting another word at a position that yields an alignment of highest probability between the source language text segment and the current target language translation. The inserted other word may have a high probability of having a zero-value fertility.

Applying one or more modification operators may include deleting from the current target language translation a word having a zero-value fertility; and/or modifying an alignment between the source language text segment and the current target language translation by swapping non-overlapping target language word segments in the current target language translation; and/or modifying an alignment between the source language text segment and the current target language translation by (i) eliminating a target language word from the current target language translation and (ii) linking words in the source language text segment.

In various embodiments, applying modification operators may include applying two or more of the following: (i) changing the translation of one or two words in the current target language translation; (ii) changing a translation of a word in the current target language translation and concurrently inserting another word at a position that yields an alignment of highest probability between the source language text segment and the current target language translation, the inserted other word having a high probability of having a zero-value fertility; (iii) deleting from the current target language translation a word having a zero-value fertility; (iv) modifying an alignment between the source language text segment and the current target language translation by swapping non-overlapping target language word segments in the current target language translation; and/or (v) modifying an alignment between the source language text segment and the current target language translation by eliminating a target language word from the current target language translation and linking words in the source language text segment.

Determining whether one or more of the modified target language translations represents an improved translation in comparison with the current target language translation may include calculating a probability of correctness for each of the modified target language translations.

The termination condition may include a determination that a probability of correctness of a modified target language translation is no greater than a probability of correctness of the current target language translation. The termination condition may be the occurrence of a completion of a predetermined number of iterations and/or the lapse of a predetermined amount of time.

In another aspect, a computer-implemented machine translation decoding method may, for example, implement a greedy decoding algorithm that iteratively modifies a target language translation of a source language text segment (e.g., a clause, a sentence, a paragraph, or a treatise) until an occurrence of a termination condition (e.g., completion of a predetermined number of iterations, lapse of a predetermined period of time, and/or a determination that a probability of correctness of a modified translation is no greater than a probability of correctness of a previous translation.)

The MT decoding method may start with an approximate target language translation and iteratively improve the translation with each successive iteration. The approximate target language translation may be, for example, a word-for-word or phrase-for-phrase gloss, or the approximate target language translation may be a predetermined translation selected from among a plurality of predetermined translations.

Iteratively modifying the translation may include incrementally improving the translation with each iteration, for example, by applying one or more modification operations on the translation.

The one or more modification operations comprises one or more of the following operations: (i) changing one or two words in the translation; (ii) changing a translation of a word and concurrently inserting another word at a position that yields an alignment of highest probability between the source language text segment and the translation, the inserted other word having a high probability of having a zero-value fertility; (iii) deleting from the translation a word having a zero-value fertility; (iv) modifying an alignment between the source language text segment and the translation by swapping non-overlapping target language word segments in the translation; and (v) modifying an alignment between the source language text segment and the translation by eliminating a target language word from the translation and linking words in the source language text segment.

In another aspect, a machine translation decoder may include a decoding engine comprising one or more modification operators to be applied to a current target language translation to generate one or more modified target language translations; and a process loop to iteratively modify the current target language translation using the one or more modification operators. The process loop may terminate upon occurrence of a termination condition. The process loop may control the decoding engine to incrementally improve the current target language translation with each iteration.

The MT decoder may further include a module (including, for example, a language model and a translation model) for determining a probability of correctness for a translation. The process loop may terminate upon a determination that a probability of correctness of a modified translation is no greater than a probability of correctness of a previous translation, and/or upon completion of a predetermined number of iterations; and/or after lapse of a predetermined period of time.

One or more of the following advantages may be provided by the greedy decoder as described herein. The techniques and methods described here may result in a MT decoder that performs with high accuracy, high speed and relatively low computational and space costs. The greedy decoder can be modified as desired to perform a full set of sentence modification operations or any subset thereof. This gives a system designer and/or end-user considerable flexibility to tailor the decoder's speed, accuracy and/or other performance characteristics to match desired objectives or constraints. The use of a set of basic modification operations, each able to be used as a standalone operator or in conjunction with the others, further enhances this flexibility. Moreover, the use of independent standalone operators as constituents of the decoding engine makes the decoder extensible and scalable. That is, different or additional modification operators can be used to suit the objectives or constraints of the system designer and/or end-user.

In conjunction with MT research and related areas in computational linguistics, researchers have developed and frequently use various types of tree structures to graphically represent the structure of a text segment (e.g., clause, sentence, paragraph or entire treatise). Two basic tree types include (1) the syntactic tree, which can be used to graphically represent the syntactic relations among components of a text segment, and (2) the rhetorical tree (equivalently, the rhetorical structure tree (RST) or the discourse tree), which can be used to graph the rhetorical relationships among components of a text segment. Rhetorical structure trees (also referred to as discourse trees) are discussed in detail in William C. Mann and Sandra A. Thompson, "Rhetorical structure theory: Toward a functional theory of text organization," *Text*, 8(3):243-281 (1988).

The example shown in FIG. 6 illustrates the types of structures that may be present in a rhetorical structure tree for a text fragment. The leaves of the tree correspond to elementary discourse units ("edus") and the internal nodes correspond to contiguous text spans. Each node in a rhetorical structure tree is characterized by a "status" (i.e., either "nucleus" or "satellite") and a "rhetorical relation," which is a relation that holds between two non-overlapping text spans. In FIG. 6, nuclei are represented by straight lines while satellites are represented by arcs.

The present inventor recognized that significant differences exist between the rhetorical structures of translations of a text in different languages (e.g., Japanese and English). Accordingly, to improve MT quality, and as a component of a larger MT system, the present inventor developed techniques for automatically rewriting (e.g., using a computer system) rhetorical structures from one language into another, for example, rewriting a rhetorical tree for a text segment in Japanese into a rhetorical tree for a counterpart text segment in English.

Implementations of the disclosed tree rewriting techniques may include various combinations of the following features.

In one aspect, automatically generating a tree (e.g., either a syntactic tree or a discourse tree) involves receiving as input a tree corresponding to a source language text segment, and applying one or more decision rules to the received input to generate a tree corresponding to a target language text segment.

In another aspect, a computer-implemented tree generation method may include receiving as input a tree corresponding to a source language text segment (e.g., clause, sentence, paragraph, or treatise), and applying one or more decision rules (e.g., a sequence of decision rules that collectively represent a transfer function) to the received input to generate a tree corresponding to a target language text segment, which potentially may be a different type of text segment.

The tree generation method further may include automatically determining the one or more decision rules based on a training set, for example, a plurality of input-output tree pairs and a mapping between each of the input-output tree pairs. The mapping between each of the input-output tree pairs may be a mapping between leaves of the input tree and leaves of the paired output tree. Mappings between leaves of input-output tree pairs can be one-to-one, one-to-many, many-to-one, or many-to-many.

Automatically determining the one or more decision rules may include determining a sequence of operations that generates an output tree when applied to the paired input tree. Determining a sequence of operations may include using a plurality of predefined operations that collectively are sufficient to render any input tree into the input tree's paired output tree. The plurality of predefined operations comprise one or more of the following: a shift operation that transfers an elementary discourse tree (edt) from an input list into a stack; a reduce operation that pops two edts from a top of the stack, combines the two popped edts into a new tree, and pushes the new tree on the top of the stack; a break operation that breaks an edt into a predetermined number of units; a create-next operation that creates a target language discourse constituent that has no correspondent in the source language tree; a fuse operation that fuses an edt at the top of the stack into the preceding edt; a swap operation that swaps positions of edts in the input list; and an assignType operation that assigns one or more of the following types to edts: Unit, MultiUnit, Sentence, Paragraph, MultiParagraph, and Text.

The plurality of predefined operations may represent a closed set that includes the shift operation, the reduce operation, the break operation, the create-next operation, the fuse operation, the swap operation and the assignType operation.

Determining a sequence of operations may result in a plurality of learning cases, one learning case for each input-output tree pair. In that case, the tree generation method may further include associating one or more features with each of the plurality of learning cases based on context. The associated features may include one or more of the following: operational and discourse features, correspondence-based features, and lexical features.

The tree generation method may further include applying a learning program (e.g., C4.5) to the plurality of learning cases to generate the one or more decision rules In another aspect, a computer-implemented tree generation module may include a predetermined set of decision rules that, when applied to a tree (e.g., syntactic or discourse) corresponding to a source language text segment, generate a tree corresponding to a target language text segment. The predetermined set of decision rules may define a transfer function between source language trees and target language trees In another aspect, determining a transfer function between trees (e.g., syntactic or discourse) of different types may include generating a training set comprising a plurality of tree pairs and a mapping between each tree pair, each tree pair comprises a source tree and a corresponding target tree, and generating a plurality of learning cases by determining, for each tree pair, a sequence of operations that result in the target tree when applied to the source tree; and generating a plurality of decision rules by applying a learning algorithm to the plurality of learning cases.

Determining a transfer function between trees of different types further may include, prior to generating the plurality of decision rules, associating one or more features with each of the learning cases based on context.

In another aspect, a computer-implemented discourse-based machine translation system may include a discourse parser that parses the discourse structure of a source language text segment and generates a source language discourse tree for the text segment; a discourse-structure transfer module that accepts the source language discourse tree as input and generates as output a target language discourse tree; and a mapping module that maps the target language discourse tree into a target text segment. The discourse-structure transfer module may include a plurality of decision rules generated from a training set of source language-target language tree pairs.

One or more of the following advantages may be provided by tree rewriting as described herein. The techniques and methods described here may result in a tree rewriting capability that allows users (e.g., human end-users such as linguistic researchers or computer processes such as MT systems) to automatically have a tree for a text segment in a source language rewritten, or translated, into a tree for the text segment translated into a target language. This functionality is useful both in its standalone form and as a component of a larger system, such as in a discourse-based machine translation system. Moreover, because the tree rewriter described here automatically learns how to rewrite trees from one language into another, the system is easy and convenient to use.

The mapping scheme used in training the tree rewriter also provides several advantages. For example, by allowing any arbitrary groupings (e.g., one-to-one, one-to-many, many-to-one, many-to-many) between leaves in the source and target trees, the flexibility, richness and robustness of the resulting mappings are enhanced.

The enhanced shift-reduce operations used in training the tree rewriter also provide several advantages. For example, the set of basic operations that collectively are sufficient to render any input tree into its paired output tree provides a powerful yet compact tool for rewriting tree structures.

The details of one or more embodiments are set forth in the accompanying drawings and the description below. Other features, objects, and advantages of the invention will be apparent from the description and drawings, and from the claims.

DRAWING DESCRIPTIONS

These and other aspects of the invention will now be described in detail with reference to the accompanying drawings, wherein:

FIG. 4 shows an example of output that a user sees as the greedy decoder produces an English translation of a French sentence.

FIG. 5 is a table showing a comparison between different decoders using a trigram language model.

FIG. 7 is an example of a Japanese source sentence.

FIG. 12 shows a block diagram of a discourse-based machine translation system with the tree rewriter as a subsystem.

FIG. 13 is a flowchart of a procedure for building a tree rewriter.

DETAILED DESCRIPTION

Greedy Decoder

A statistical MT system that translates, for example, French sentences into English, can be divided into three parts: (1) a language model (LM) that assigns a probability P(e) to any English string, (2) a translation model (TM) that assigns a probability P(f|e) to any pair of English and French strings, and (3) a decoder. The decoder takes a previously unseen sentence f and tries to find the e that maximizes P(e|f), or equivalently maximizes P(e)·P(f|e).

Brown et al., "The mathematics of statistical machine translation: Parameter estimation", *Computational Linguistics,* 19(2), 1993, introduced a series of TMs based on word-for-word substitution and re-ordering, but did not include a decoding algorithm. If the source and target languages are constrained to have the same word order (by choice or through suitable pre-processing), then the linear Viterbi algorithm can be applied as described in Tillmann et al., "A DP-based search using monotone alignments in statistical translation", In *Proc. ACL,* 1997. If re-ordering is limited to rotations around nodes in a binary tree, then optimal decoding can be carried out by a high-polynomial algorithm (Wu, "A polynomial-time algorithm for statistical machine translation", In *Proc. ACL,* 1996). For arbitrary word-reordering, the decoding problem is NP-complete (nondeterministic polynomial time complete) (Knight, "Decoding complexity in word-replacement translation models", *Computational Linguistics,* 25(4), 1999).

One strategy (Brown et al., "Method and system for natural language translation," U.S. Pat. No. 5,477,451, 1995; Wang et al., "Decoding algorithm in statistical machine translation", In *Proc. ACL,* 1997) is to examine a large subset of likely decodings and chose just from that. Of course, it is possible to miss a good translation this way.

Thus, while decoding is a clear-cut optimization task in which every problem instance has a right answer, it is hard to come up with good answers quickly. The following sets forth details of a fast greedy decoder and compares its performance with that of a traditional stack decoder.

Figure 1A:
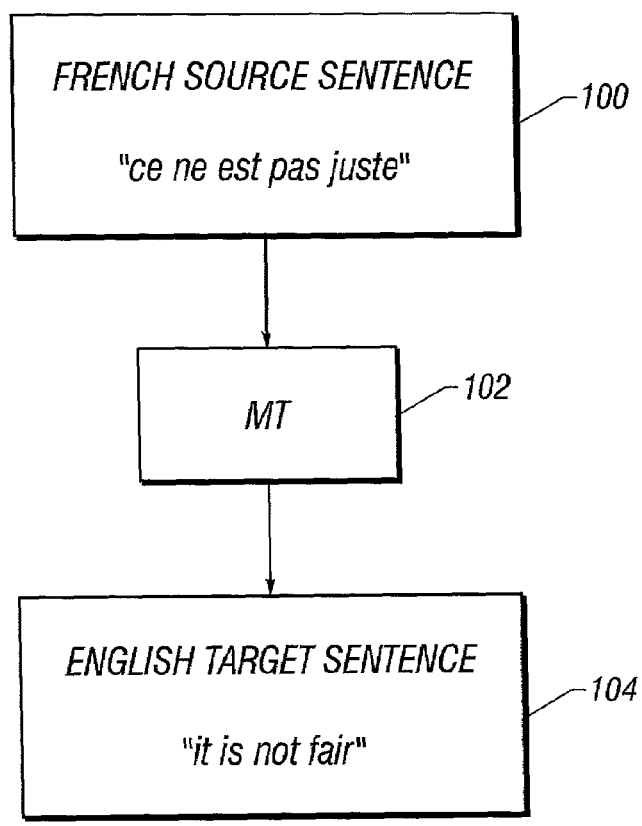
FIG. 1A shows a block diagram of machine translation from a user's perspective.
Figure 1B:
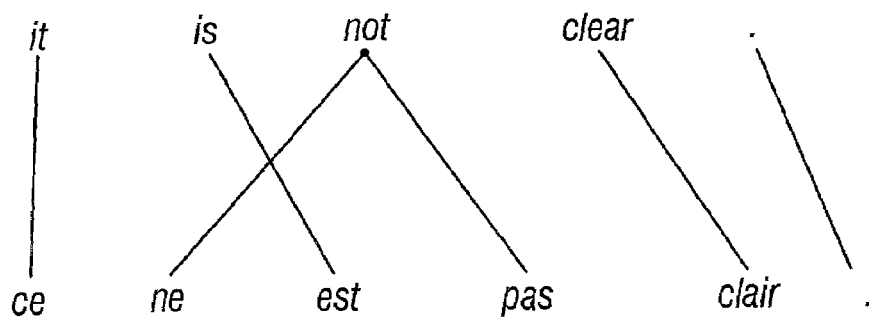
FIG. 1B shows an example of word-level alignment.

In developing the greedy decoder IBM Model 4 was used, which revolves around the notion of a word alignment over a pair of sentences (see FIG. 1B). A word alignment assigns a single home (English string position) to each French word. If two French words align to the same English word, then that English word is said to have a fertility of two. Likewise, if an English word remains unaligned-to, then it has fertility zero. The word alignment in FIG. 1B is shorthand for a hypothetical stochastic process by which an English string gets converted into a French string. There are several sets of decisions to be made.

First, every English word is assigned a fertility. These assignments are made stochastically according to a table $n(\phi_1 | e_i)$. Any word with fertility zero is deleted from the string, any word with fertility two is duplicated, etc. If a word has fertility greater than one, it is called very fertile.

After each English word in the new string, the fertility of an invisible English NULL element with probability $p_1$ (typically about 0.02) is incremented. The NULL element ultimately produces "spurious" French words.

Next, a word-for-word replacement of English words (including NULL) by French words is performed, according to the table $t(f_j|e_i)$.

Finally, the French words are permuted. In permuting, IBM Model 4 distinguishes between French words that are heads (the leftmost French word generated from a particular English word), non-heads (non-leftmost, generated only by very fertile English words), and NULL-generated.

Heads. The head of one English word is assigned a French string position based on the position assigned to the previous English word. If an English word $E_{e-1}$ translates into something at French position j, then the French head word of $e_i$ is stochastically placed in French position k with distortion probability $d_1(k-j|class(e_{i-1}), class(f_k))$, where "class" refers to automatically determined word classes for French and English vocabulary items. This relative offset k−j encourages adjacent English words to translate into adjacent French words. If $e_{i-1}$ is infertile, then j is taken from $e_{i-2}$, etc. If $e_{i-1}$ is very fertile, then j is the average of the positions of its French translations.

Non-heads. If the head of English word $e_i$ is placed in French position j, then its first non-head is placed in French position k (>j) according to another table $d_{>1}(k-j\ class|(f_k))$. The next non-head is placed at position q with probability $d_{>1}(q-k|class(f_q))$, and so forth.

NULL-generated. After heads and non-heads are placed, NULL-generated words are permuted into the remaining vacant slots randomly. If there are $\phi_0$ NULL-generated words, then any placement scheme is chosen with probability $1/\phi_0!$.

These stochastic decisions, starting with e, result in different choices of f and an alignment of f with e. e is mapped onto a particular <a,f> pair with probability:

$$P(a, f | e) = \prod_{i=1}^{l} n(\phi_i | e_i) \times \prod_{i=1}^{l} \prod_{k=1}^{\phi_i} t(\tau_{ik} | e_i) \times$$

$$\prod_{i=1,\phi_1>0}^{l} d_1(\pi_{i1} - c_{p_i} | class\ (e_{p_i}), class\ (\tau_{i1}))$$

$$\prod_{i=1}^{l} \prod_{k=2}^{\phi_i} d_{>1}(\pi_{ik} - \pi_{i(k-1)} | class\ (\tau_{ik})) \times$$

$$\binom{m-\phi_0}{\phi_0} p_1^{\phi_0}(1-p_1)^{m-2\phi_0} x$$

$$\prod_{k=1}^{\phi_0} t(\tau_{0k} | NULL)$$

where the factors separated by x symbols denote fertility, translation, head permutation, non-head permutation, null-fertility, and null-translation probabilities. The symbols in this formula are: l (the length of e), m (the length of f), $e_i$ (the i$^{th}$ English word in e), $E_0$ (the NULL word), $\phi_1$ (the fertility of $e_i$), $\phi_0$ (the fertility of the NULL word), $\tau_{ik}$ (the k$^{th}$ French word produced by $e_i$ in a), $\pi_{ik}$ (the position of $\tau_{ik}$ in f), $\rho_I$ (the position of the first fertile word to the left of $e_i$ in a), $c_{\pi I}$ (the ceiling of the average of all $\rho_{\pi ik}$ for $\pi_i$, or 0 if $\pi_i$ is undefined).

In view of the foregoing, given a new sentence f, then an optimal decoder will search for an e that maximizes P(e|f)≈P(e)·P(f|e). Here, P(f|e) is the sum of P(a,f|e) over all possible alignments a. Because this sum involves significant computation, typically it is avoided by instead searching for an <e,a> pair that maximizes P(e,a|f)≈P(e)·P(a,f|e). It is assumed that the language model P(e) is a smoothed n-gram model of English.

Figure 2:
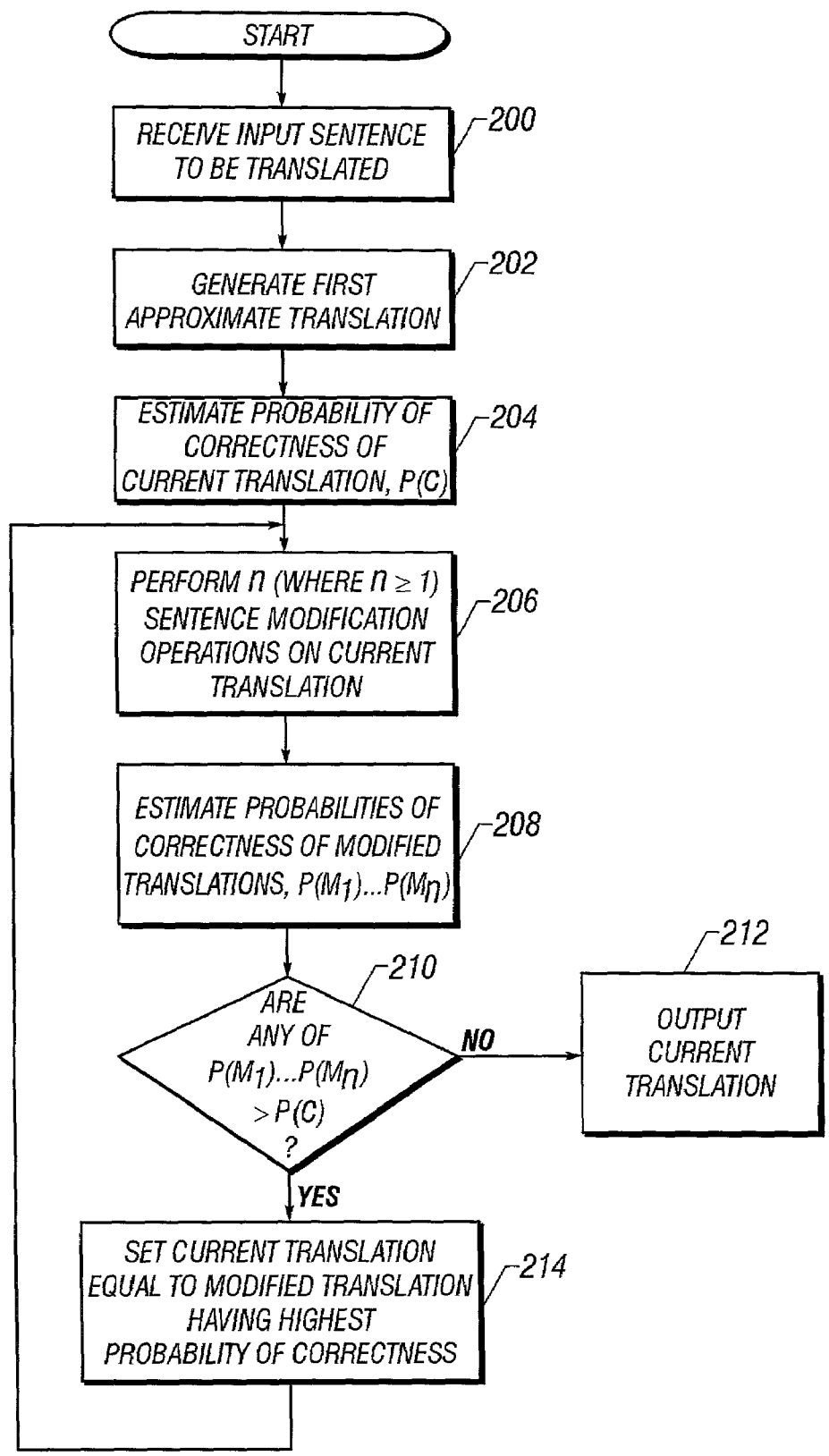
FIG. 2 shows a flowchart of the operation of an embodiment of the greedy decoder.

FIG. 2 is a flowchart of the operation of an embodiment of a greedy decoder for performing MT. As shown therein, the first step 200 is to receive an input sentence to be translated.

Although in this example, the text segment being translated is a sentence, virtually any other text segment could be used, for example, clauses, paragraphs or entire treatises.

Figure 3:
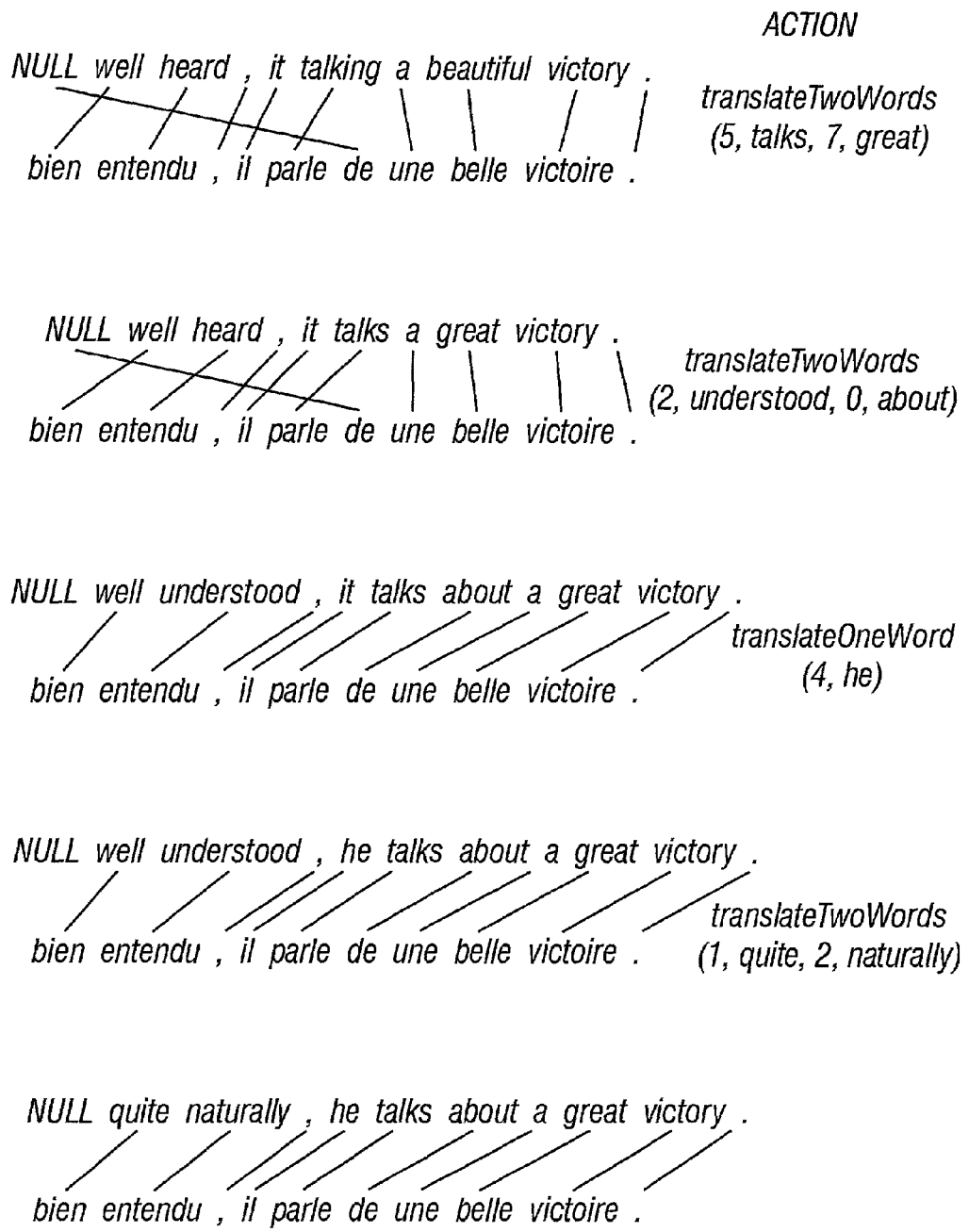
FIG. 3 shows an example of the greedy decoder producing an English translation of a French sentence.
Figure 6:
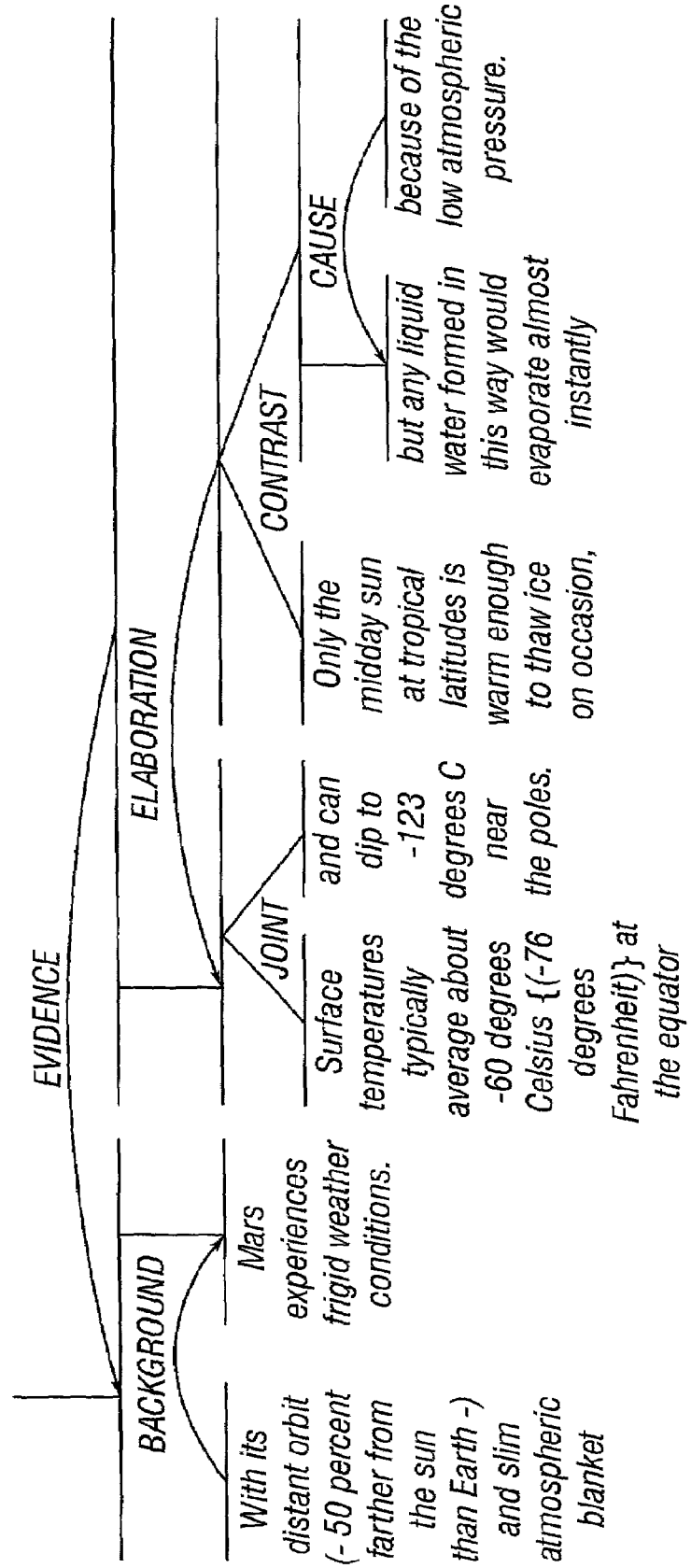
FIG. 6 shows an example of a rhetorical structure tree.

In step 202, as a first approximation of the translation, the greedy decoder generates a "gloss" of the input sentence, essentially a word-for-word translation. The gloss is constructed by aligning each French word $f_j$ with its most likely English translation $ef_j$ ($ef_j$=argmax$_e$ t(e|$f_j$)) For example, in translating the French sentence "Bien entendu, il parle de une belle victoire", the greedy decoder initially assumes that a good translation is "Well heard, it talking a beautiful victory" because the best translation of "bien" is "well", the best translation of "entendu" is "heard", and so on. The alignment corresponding to this translation is shown at the top of FIG. 3.

In step 204, the decoder estimates the probability of correctness of the current translation, P(c).

After the initial alignment is generated in step 202, the greedy decoder tries to improve it in step 206. That is, the decoder tries to find an alignment (and implicitly, a translation) of higher probability by applying one or more sentence modification operators, described below. The use of a word-level alignment and the particular operators described below were chosen for this particular embodiment. However, alternative embodiments using different statistical models may benefit from different or additional operations.

The following operators collectively make-up the decoder's translation engine, and include the following:

TranslateOneOrTwoWords ($j_1$, $e_1$, $j_2$, $e_2$)

This operation changes the translation of one or two French words, those located at positions $j_1$ and $j_2$, from $ef_{j1}$ and $ef_{j2}$ into $e_1$ and $e_2$. If $ef_j$ is a word of fertility 1 and $e_k$ is NULL, then $ef_j$ is deleted from the translation. If $ef_j$ is the NULL word, the word $e_k$ is inserted into the translation at the position that yields an alignment of highest probability. If $ef_{j1}$=$e_1$ or $ef_{j2}$=$e_2$, then this operation amounts to changing the translation of a single word.

TranslateAndInsert (j, $e_1$, $e_2$)

This operation changes the translation of the French word located at position j from $e_{fj}$ into $e_1$ and simultaneously inserts word $e_2$ at the position that yields the alignment of highest probability. Word $e_2$ is selected from an automatically derived list of 1024 words with high probability of having fertility 0. When $e_{fj}$=$e_1$, this operation amounts to inserting a word of fertility 0 into the alignment.

RemoveWordOfFertility0 (i)

This operation deletes the word of fertility 0 at position i in the current alignment.

SwapSegments ($i_1$, $i_2$, $j_1$, $j_2$)

This operation creates a new alignment from the old one by swapping non-overlapping English word segments [$i_1$, $i_2$] and [$j_1$, $j_2$]. During the swap operation, all existing links between English and French words are preserved. The segments can be as small as a word or as long as |e|−1 words, where |e| is the length of the English sentence.

JoinWords ($i_1$, $i_2$)

This operation eliminates from the alignment the English word at position $i_1$ (or $i_2$) and links the French words generated by $e_{i1}$ (or $e_{i2}$) to $e_{i2}$ (or $e_{i1}$).

At step 208, the decoder estimates the probabilities of correctness, P($M_1$) . . . P($M_n$), for each of the results of the sentence modification operations. That is, the probability for each new resulting translation is determined At step 210, the decoder determines whether any of the new translations are better than the current translation by comparing their respective probabilities of correctness. If any of the new translations represents a better solution than the current translation, then the best new translation (that is, the translation solution having the highest probability of correctness) is set as the current translation in step 214 and the decoding process returns to step 206 to perform one or more of the sentence modification operations on the new current translation solution.

Steps 206, 208, 210 and 214 repeat until the sentence modification operations cease (as determined in step 210) to produce translation solutions having higher probabilities of correctness, at which point, the decoding process halts at step 212 and the current translation is output as the final decoding solution. Alternatively, the decoder could cease after a predetermined number of iterations chosen, for example, either by a human end-user or by an application program using the decoder as a translation engine.

Accordingly, in a stepwise fashion, starting from the initial gloss, the greedy decoder uses a process loop (e.g., as shown in FIG. 2, steps 206, 208, 210 and 214) to iterate exhaustively over all alignments that are one operation away from the alignment under consideration. At every step, the decoder chooses the alignment of highest probability, until the probability of the current alignment can no longer be improved. When it starts from the gloss of the French sentence "Bien entendu, il parle de une belle victoire.", for example, the greedy decoder alters the initial alignment incrementally as shown in FIG. 3, eventually producing the translation "Quite naturally, he talks about a great victory.". In this process, the decoder explores a total of 77421 distinct alignments/translations, of which "Quite naturally, he talks about a great victory." has the highest probability.

In step 206 of the decoding process, either all of the five sentence modification operations can be used or any subset thereof may be used to the exclusion of the others, depending on the preferences of the system designer and/or end-user. For example, the most time consuming operations in the decoder are swapSegments, translateoneOrTwoWords, and translateAndInsert. SwapSegments iterates over all possible non-overlapping span pairs that can be built on a sequence of length |e|. TranslateOneOrTwoWords iterates over $|f|^2 \times |t|^2$ alignments, where |f| is the size of the French sentence and |t| is the number of translations associated with each word (in this implementation, this number is limited to the top 10 translations). TranslateAndInsert iterates over $|f| \times |t| \times |z|$ alignments, where |z| is the size of the list of words with high probability of having fertility 0 (1024 words in this implementation). Accordingly, the decoder could be designed to omit one or more of these slower operations in order to speed up decoding, but potentially at the cost of accuracy. Alternatively, or in addition, the decoder could be designed to use different or additional sentence modification operations according to the objectives of the system designer and/or end-user.

An advantage of the greedy decoder comes from its speed. As the experiments described below demonstrate, the greedy decoder can produce translations faster than any other decoder. The greedy decoder is an instance of an "anytime algorithm"—the longer it runs, the better the translation it finds. One potential tradeoff of the greedy decoder relates to the size of the solution space that it explores, which is relatively small. The farther away a good translation is from the initial gloss, the less likely the greedy decoder is to find it.

FIG. 4 shows another example of the greedy decoder in action in which an acceptable solution is reached in four iterations. As shown therein, the input sentence to be translated is "ce ne est pas juste." The decoder uses the initial gloss "that not is not fair." and determines that this translation solution (Iteration 1) has a probability of correctness ("Aprob"—the product of LMprob and TMprob) of 1.13162e-22, based on a language model probability (LMprob) of 2.98457e-14 and a translation model probability (TMprob) of 3.79156e-09.

In the second iteration, the decoder changes the first instance of the word "not" in the translation to "is" by applying the translateOneOrTwoWords operation, resulting in a new translation solution "that is not fair", having the probabilities shown in FIG. 4, Iteration 2. In the third iteration, the decoder applies the removeWordOfFertility0 operation and drops one instance of the word "is" in the translation, resulting in a new translation solution "that is not fair", having the probabilities shown in FIG. 4, Iteration 3. In the fourth and final iteration, the decoder applies the translateOneOrTwoWords operation again to change the word "that" in the translation to "it", resulting in the final translation solution "it is not fair", having the probabilities shown in FIG. 4, Iteration 4.

To determine the performance of the greedy decoder, a series of experiments was performed. In all experiments, decoding was performed using only the top 10 translations of a word, as determined during training, and a list of 1024 words of fertility 0, which was also extracted automatically from the test corpus.

In experiments to determine the accuracy and compare the speed of the greedy decoder described to a conventional stack decoder (such as described in U.S. Pat. No. 5,477,451 to Brown et al., a test collection of 505 sentences was used, uniformly distributed across the lengths 6, 8, 10, 15, and 20. Decoders were evaluated with respect to (1) speed, and (2) translation accuracy.

The results in the table shown in FIG. 5, obtained with decoders that use a trigram language model, show that the greedy decoding algorithm is an advantageous alternative to the traditional stack decoding algorithm. Even when the greedy decoder used an optimized-for-speed set of operations (that is, a subset of the total set of five sentence modification operations discussed above) in which at most one word is translated, moved, or inserted at a time—which is labeled "greedy*" in FIG. 5—the translation accuracy is affected only slightly. In contrast, the translation speed increases with at least one order of magnitude. Depending on the application of interest, one may choose to use a slow decoder that provides optimal results or a fast, greedy decoder that provides non-optimal, but acceptable results.

Alternative embodiments for the greedy decoder are possible. For example, the greedy decoder could start with multiple different initial translations (e.g., different variations on the gloss used in step 202 in FIG. 2) and then run the greedy decoding algorithm (i.e., steps 204-214 in FIG. 2) on each of the different initial translations in parallel. For example, the greedy decoder code start with an initial, approximate translation selected from among multiple translated phrases stored in a memory. In the end, the best translation could be selected. This parallel translation of different initial solutions could result in more accurate translations.

Tree Rewriter

Almost all conventional MT systems process text one sentence at a time. Because of this limited focus, MT systems generally cannot re-group and re-order the clauses and sentences of an input text to achieve the most natural rendering in a target language. Yet, even between languages as close as English and French, there is a 10% mismatch in number of sentences—what is said in two sentences in one language is said in only one, or in three, in another (Gale et al., "A program for aligning sentences in bilingual corpora," *Computational Linguistics*, 19(1):75-102, 1993). For distant language pairs, such as Japanese and English, the differences are more significant.

Consider, for example, the Japanese sentence shown in FIG. 7 ("text (1)"). The following ("text(2)") is a word-by-word "gloss" of text (1):

(2) [The Ministry of Health and Welfare last year revealed[1]] [population of future estimate according to[2]] [in future 1.499 persons as the lowest[3]] [that after *SAB* rising to turn that[4]] [*they* estimated but[5]] [already the estimate misses a point[6]] [prediction became.[7]]

In contrast, a two-sentence translation of the Japanese sentence produced by a professional translator ("text(3)") reads as follows:

(3) [In its future population estimates[1]] [made public last year,[2]] [the Ministry of Health and Welfare predicted that the SAB would drop to a new low of 1.499 in the future,[3]] [but would make a comeback after that,[4]] [increasing once again.[5]] [However, it looks as if that prediction will be quickly shattered.[6]]

The labeled spans of text represent elementary discourse units (edus), i.e., minimal text spans that have an unambiguous discourse function (Mann et al., "Rhetorical structure theory: Toward a functional theory of text organization," *Text*, 8(3):243-281, 1988). If the text fragments are analyzed closely, one notices that in translating text (1), a professional translator chose to realize the information in Japanese unit 2 first (unit 2 in text (1) corresponds roughly to unit 1 in text (3)); to realize then some of the information in Japanese unit 1 (part of unit 1 in text (1) corresponds to unit 2 in text (3)); to refuse then information given in units 1, 3 and 5 in text (1) and realize it in English as unit 3; and so on. Also, the translator chose to re-package the information in the original Japanese sentence into two English sentences.

At the elementary unit level, the correspondence between the Japanese sentence in text (1) and its English translation in text (3) can be represented as in mappings (4), below, where $j \subset e$ denotes the fact that the semantic content of unit j is realized fully in unit e; $j \subset e$ denotes the fact that the semantic content of unit e is realized fully in unit j; j=e denotes the fact that units j and e are semantically equivalent; and $j \cong e$ denotes the fact that there is a semantic overlap between units j and e, but neither proper inclusion not proper equivalence.

(4)

$j_1 \supset e_2; j_1 \cong e_3;$ $j_2 = e_1;$ $j_3 \subset e_3;$ $j_4 \cong e_4; j_4 \cong e_5;$ $j_5 \cong e_3;$ $j_6 \subset e_6;$ $j_7 \subset e_6$ Hence, the mappings in (4) provide an explicit representation of the way information is re-ordered and re-packaged when translated from Japanese into English. However, when translating text, it is also the case that the rhetorical rendering changes. What is realized in Japanese using a CONTRAST relation can be realized in English using, for example, a COMPARISON OR A CONCESSION relation.

Figure 8:
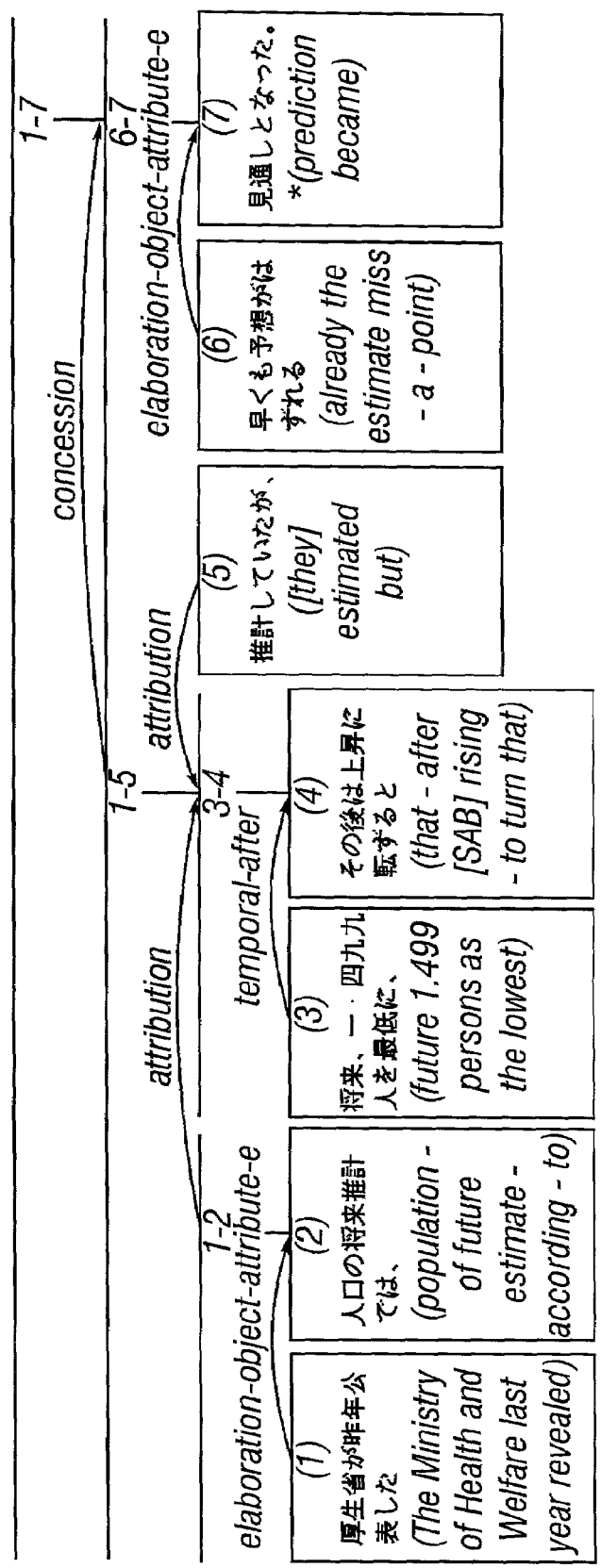
FIG. 8 is the discourse structure of the Japanese source sentence in FIG. 7.
Figure 9:
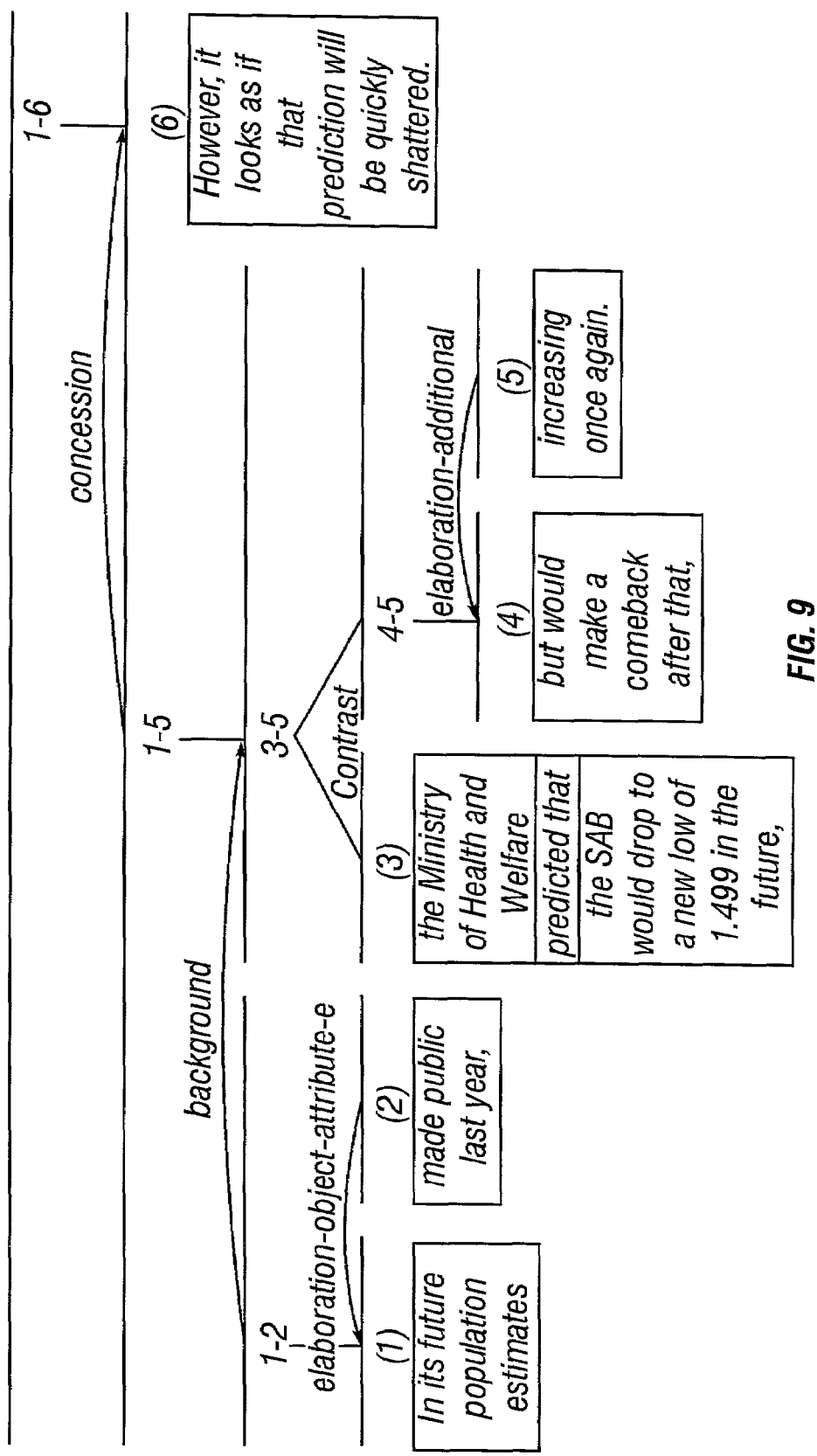
FIG. 9 is the discourse structure of an English target sentence translated from the Japanese source sentence of FIG. 11.

FIGS. 8 and 9 present in the style of Mann, supra, the discourse structures of text fragments (1) and (3), above. Each discourse structure is a tree whose leaves correspond to contiguous text spans. Each node is characterized by a status (NUCLEUS or SATELLITE) and a rhetorical relation, which is a relation that holds between two non-overlapping text spans. The distinction between nuclei and satellites comes from the empirical observation that the nucleus expresses what is more essential to the writer's intention than the satellite; and that the nucleus of a rhetorical relation is comprehensible independent of the satellite, but not vice versa. When spans are equally important, the relation is multinuclear; for example, the CONTRAST relation that holds between unit [3] and span [4,5] in the rhetorical structure of the English text in FIGS. 8 and 9 is multinuclear. Rhetorical relations that end in the suffix "-e" denote relations that correspond to embedded syntactic constituents. For example, the ELABORATION-OBJECT-ATTRIBUTE-E relation that holds between units 2 and 1 in the English discourse structure corresponds to a restrictive relative.

If one knows the mappings at the edu level, one can determine the mappings at the span (discourse constituent) level as well. For example, using the elementary mappings in (4), one can determine that Japanese span [1,2] corresponds to the English span [1,2], Japanese unit [4] to English span [4,5], Japanese span [6,7] to English unit [6], Japanese span [1,5] to English span [1,5], and so on. As FIGS. 8 and 9 show, the CONCESSION relation that holds between spans [1,5] and [6,7] in the Japanese tree corresponds to a similar relation that holds between span [1,5], and unit [6] in the English tree (modulo the fact that, in Japanese, the relation holds between sentence fragments, while in English it holds between full sentences). However, the TEMPORAL-AFTER relation that holds between units [3] and [4] in the Japanese tree is realized as a CONTRAST relation between unit [3] and span [4,5] in the English tree. And because Japanese units [6] and [7] are fused into unit [6] in English, the relation ELABORATION-OBJECT-ATTRIBUTE-E is no longer made explicit in the English text.

Some of the differences between the two discourse trees in FIGS. 8 and 9 have been traditionally addressed in MT systems at the syntactic level. For example, the re-ordering of units 1 and 2 can be dealt with using only syntactic models. However, as discussed below, there are significant differences between Japanese and English with respect to the way information is packaged and organized rhetorically not only at the sentence level, but also, at the paragraph and text levels. More specifically, as humans translate Japanese into English, they re-order the clauses, sentences, and paragraphs of Japanese texts, they re-package the information into clauses, sentences and paragraphs that are not a one-to-one mapping of the original Japanese units, and they rhetorically re-organize the structure of the translated text so as to reflect rhetorical constraints specific to English. If a translation system is to produce text that is not only grammatical but also coherent, it will have to ensure that the discourse structure of the target text reflects the natural renderings of the target language, and not that of the source language.

In the Experiment section below, it is empirically shown that there are significant differences between the rhetorical structure of Japanese texts and their corresponding English translations. These differences further demonstrate the need and desirability of developing computational models for discourse structure rewriting.

Experiment

In order to assess the role of discourse structure in MT, a corpus of discourse trees was manually built for 40 Japanese texts and their corresponding translations. The texts were selected randomly from the ARPA corpus (White et al., "Evaluation in the ARPA machine-translation program: 1993 methodology," In *Proceedings of the ARPA Human Language Technology Workshop*, pages 135-140, Washington, D.C., 1994). On average, each text had about 460 words. The Japanese texts had a total of 335 paragraphs and 773 sentences. The English texts had a total of 337 paragraphs and 827 sentences.

A discourse annotation protocol was developed for Japanese and English along the lines followed by Marcu et al., "Experiments in constructing a corpus of discourse trees," In *Proc. Of the ACL'99 Workshop on Standards and Tools for Discourse Tagging*, pages 48-57, Maryland (1999). Marcu's discourse annotation tool (1999) was used in order to manually construct the discourse structure of all Japanese and English texts in the corpus. Ten percent of the Japanese and English texts were rhetorically labeled by two annotators. The tool and the annotation protocol are available at http://www.isi.edu/~marcu/software/

The annotation procedure yielded over the entire corpus 2641 Japanese edus and 2363 English edus.

TABLE 1

| Corpus | Tagging reliability | | | |
| --- | --- | --- | --- | --- |
| | $K_{u\,(3)}$ | $K_s$ (#) | $K_n$ (#) | $K_r$ (#) |
| Japanese | 0.856 (80) | 0.785 (3377) | 0.724 (3377) | 0.650 (3377) |
| English | 0.925 (60) | 0.866 (1826) | 0.839 (1826) | 0.748 (1826) |

The reliability of the annotation was computer using Marcu et al. (1999)'s method for computing kappa statistics (Siegel et al., *Non-parametric Statistics for the Behavioral Sciences*, McGraw-Hill, Second edition, 1988) over hierarchical structures. Table 1 above displays average kappa statistics that reflect the reliability of the annotation of elementary discourse units, $k_u$, hierarchical discourse spans, $k_s$, hierarchical nuclearity assignments, $k_n$, and hierarchical rhetorical relation assignments, $k_r$. Kappa figures higher than 0.8 correspond to good agreement; kappa figures higher than 0.6 correspond to acceptable agreement. All kappa statistics were statistically significant at levels higher than $\alpha=0.01$. In addition to the kappa statistics, table 1 also displays in parentheses the average number of data points per document, over which the kappa statistics were computed.

For each pair of Japanese-English discourse structures, an alignment file was also built manually, which specified in the notation discussed on page 1 the correspondence between the edus of the Japanese text and the edus of the English translation.

The similarity between English and Japanese discourse trees was computed using labeled recall and precision figures that reflected the resemblance of the Japanese and English discourse structures with respect to their assignment of edu boundaries, hierarchical spans, nuclearity, and rhetorical relations.

Because the trees compared differ from one language to the other in the number of elementary units, the order of these units, and the way the units are grouped recursively into discourse spans, two types of recall and precision figures were computed. In computing Position-Dependent (P-D) recall and precision figures, a Japanese span was considered to match an English span when the Japanese span contained all the Japanese edus that corresponded to the edus in the English span, and when the Japanese and English spans appeared in the same position with respect to the overall structure. For example, the English tree in FIGS. 8 and 9 are characterized by 10 subsentential spans: [1], [2], [3], [4], [5], [6], [1,2], [4,5], [3,5], and [1,5]. (Span [1,6] subsumes 2 sentences, so it is not sub-sentential.) The Japanese discourse tree has only 4 spans that could be matched in the same positions with English spans, namely spans [1,2], [4], [5], and [1,5]. Hence the similarity between the Japanese tree and the English tree with respect to their discourse below the sentence level has a recall of 4/10 and a precision of 4/11 (in FIGS. 8 and 9, there are 11 sub-sentential Japanese spans).

In computing Position-Independent (P-I) recall and precision figures, even when a Japanese span "floated" during the translation to a position in the English tree, the P-I recall and precision figures were not affected. The Position-Independent figures reflect the intuition that if two trees $t_1$ and $t_2$ both have a subtree t, $t_1$ and $t_2$ are more similar than if they were if they didn't share a tree. At the sentence level, it is assumed that if, for example, the syntactic structure of a relative clause is translated appropriately (even though it is not appropriately attached), this is better than translating wrongly that clause. The Position-Independent figures offer a more optimistic metric for comparing discourse trees. They span a wider range of values than the Position-Dependent figures, which enables a better characterization of the differences between Japanese and English discourse structures. When one takes an optimistic stance, for the spans at the sub-sentential level in the trees in Table 1 the recall is 6/10 and the precision is 6/11 because in addition to spans [1,2], [4], [5], and [1,5], one can also match Japanese span [1] to English span [2] and Japanese span [2] to Japanese span [1].

In order to provide a better estimate of how close two discourse trees were, Position-Dependent and -Independent recall and precision figures were computed for the sentential level (where units are given by edus and spans are given by sets of edus or single sentences); paragraph level (where units are given by sentences and spans are given by sets of sentences or single paragraphs); and text level (where units are given by paragraphs and spans are given by sets of paragraphs). These figures offer a detailed picture of how discourse structures and relations are mapped from one language to the other across all discourse levels, from sentence to text. The differences at the sentence level can be explained by differences between the syntactic structures of Japanese and English. The differences at the paragraph and text levels have a purely rhetorical explanation.

When the recall and precision figures were computed with respect to the nuclearity and relation assignments, the statuses and the rhetorical relations that labeled each pair of spans were also factored in.

Table 2 above summarizes the results (P-D and P-I (R)ecall and (P)recision figures) for each level (Sentence, Paragraph, and Text). The numbers in the "Weighted Average" line report averages of the Sentence-, Paragraph-, and Text-specific figures, weighted according to the number of units at each level. The numbers in the "All" line reflect recall and precision figures computed across the entire trees, with no attention paid to sentence and paragraph boundaries.

Given the significantly different syntactic structures of Japanese and English the recall and precision results were low, reflecting the similarity between discourse trees built below the sentence level. However, as Table 2 shows, these are significant differences between discourse trees at the paragraph and text levels as well. For example, the Position-Independent figures show that only about 62% of the sentences and only about 53% of the hierarchical spans built across sentences could be matched between the two corpora. When one looks at the status and rhetorical relations associated with the spans built across sentences at the paragraph level, the P-I recall and precision figures drop to about 43% and 35% respectively.

The differences in recall and precision are explained both by differences in the way information is packaged into paragraphs in the two languages and the way it is structured rhetorically both within and about the paragraph level.

These results strongly suggest that if one attempts to translate Japanese into English on a sentence-by-sentence basis, it is likely that the resulting text will be unnatural from a discourse perspective. For example, if some information rendered using a CONTRAST relation in Japanese is rendered using an ELABORATION relation in English, it would be inappropriate to use a discourse marker like "but" in the English translation, although that would be consistent with the Japanese discourse structure.

An inspection of the rhetorical mappings between Japanese and English revealed that some Japanese rhetorical renderings are consistently mapped into one or a few preferred renderings in English. For example, 34 of 115 CONTRAST relations in the Japanese texts are mapped into CONTRAST relations in English; 27 become nuclei of relations such as ANTITHESIS and CONCESSION, 14 are translated as COMPARISON relations, 6 as satellites of CONCESSION relations, 5 as LIST relations, etc.

TABLE 2

Similarity of Japanese and English discourse structures

| Level | Units | | Spans | | Status/Nuclearity | | Relations | |
|---|---|---|---|---|---|---|---|---|
| | P-D R | P-D P | P-D R | P-D P | P-D R | P-D P | P-D R | P-D P |
| Sentence | 29.1 | 25.0 | 27.2 | 22.7 | 21.3 | 17.7 | 14.9 | 12.4 |
| Paragraph | 53.9 | 53.4 | 46.8 | 47.3 | 38.6 | 39.0 | 31.9 | 32.3 |
| Text | 41.3 | 42.6 | 31.5 | 32.6 | 28.8 | 29.9 | 26.1 | 27.1 |
| Weighted Average | 36.0 | 32.5 | 31.8 | 28.4 | 26.0 | 23.1 | 20.1 | 17.9 |
| ALL | 8.2 | 1.4 | 5.9 | 5.3 | 4.4 | 3.9 | 3.3 | 3.0 |
| | P-I R | P-IP | P-I R | P-IP | P-I R | P-IP | P-I R | P-IP |
| Sentence | 71.0 | 61.0 | 56.0 | 46.6 | 44.3 | 36.9 | 30.5 | 25.4 |
| Paragraph | 62.1 | 61.6 | 53.2 | 53.8 | 43.3 | 43.8 | 35.1 | 35.5 |
| Text | 74.1 | 76.5 | 54.4 | 56.5 | 48.5 | 50.4 | 41.1 | 42.7 |
| Weighted Average | 69.6 | 63.0 | 55.2 | 49.2 | 44.8 | 39.9 | 33.1 | 29.5 |
| ALL | 74.5 | 66.8 | 50.6 | 45.8 | 39.4 | 35.7 | 26.8 | 24.3 |

The Discourse-based Transfer Model

Figure 10:
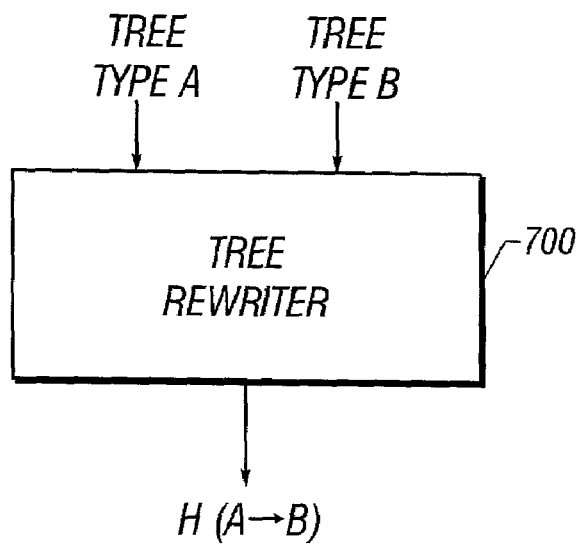
FIG. 10 shows a block diagram of the tree rewriter.

FIG. 10 is a block diagram of a tree rewriter in the process of being trained. As shown therein, the tree rewriter 700 takes as input two different types of trees, for example, a tree of type A and another tree of type B, and automatically learns how to rewrite type A trees into type B trees. The tree rewriter 700 produces as output a transfer function, H(A→B), for rewriting trees of type A into trees of type B. Accordingly, assuming type A corresponds to trees in Japanese and type B corresponds to trees in English, H(A→B) enables a user (e.g., either a human end-user or a software application invoking the tree rewriter) to automatically convert any tree structure in English into a counterpart tree structure in Japanese.

The tree rewriter works on syntactic trees, rhetorical trees, and virtually any other type of tree structure used in computational linguistics. The tree rewriter has applications not only in machine translation, but also in summarization, discourse parsing, syntactic parsing, information retrieval, automatic test scoring and other applications that generate or use trees. In machine translation, for example, the tree rewriter can be used to rewrite a syntactic/rhetorical tree specific to one language into a syntactic/rhetorical tree for another language. In summarization, the tree rewriter can be used to rewrite the discourse/syntactic structure of a long text or sentence into the discourse/syntactic structure of a short text or sentence.

Figure 11:
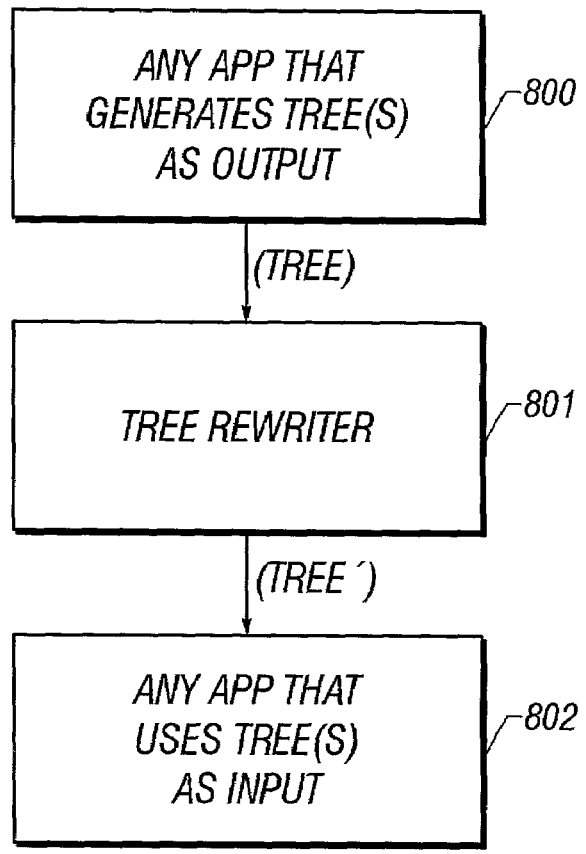
FIG. 11 shows a block diagram of how a tree rewriter can be used as a subsystem of a larger system.

This high degree of general applicability is shown in FIG. 11, in which the tree rewriter 801, after it has been trained to learn the transfer function H(Tree→Tree'), can accept a tree as input from any application 800 that generates trees as output. At the output side, the tree rewriter's output (tree'—a rewritten version of the input tree) can be used as input to any application that uses trees as input.

FIG. 12 shows a block diagram of a specific application for the tree rewriter as a component of a larger system—namely, a discourse-based machine translation system. Unlike conventional MT systems which in effect adopt a "tiled" approach to translation, for example, by translating individual sentences of a larger work (e.g., a treatise) separately, the discourse-based MT system of FIG. 12 translates the entire text as whole, potentially resulting in a translation that has a different number and/or arrangement of sentences than the original, but which better captures the underlying discourse, or rhetoric, of the original text.

As shown in FIG. 12, the discourse-based MT system 910 receives as input a source language text 900 and produces as output a target language text 908, which is a discourse-based translation of the source language text 900. The system 910 includes three basic components—a discourse parser 902, a discourse-structure transfer module 904 (i.e., a specific instance of a tree rewriter that has been trained to rewrite trees using the transfer function H(Tree→Tree')) and a target language tree-text mapper 906.

The discourse parser 902 initially derives the discourse structure of the source language text and produces as output a corresponding discourse tree. Details of a discourse parser that can be used as discourse parser 902 are set forth in Daniel Marcu, "A Decision-Based Approach to Rhetorical Parsing," Proceedings of ACL'99 (1999), which is incorporated herein.

The target language tree-text mapper 906 is a statistical module that maps the input text into the target language using translation and language models that incorporate discourse-specific features, which are extracted from the outputs of the discourse parser 209 and the discourse-structure transfer module 904. Details of a suitable mapper 906 are set forth in Ulrich Germann, Michael Jahr, Kevin Knight, Daniel Marcu, Kenji Yamada, "Fast Decoding and Optimal Decoding for Machine Translation," Proceedings of the 39th Annual Meeting of the Association for Computational Linguistics, Jul. 6-11, 2001, which is incorporated herein.

As noted above, the discourse-structure transfer module 904 is a specific instance of a tree rewriter that has been trained to rewrite trees from the desired input type into the desired output type. More specifically, the discourse-structure transfer module 904 rewrites the discourse structure of the input text so as to reflect a discourse rendering that is natural to the target text.

FIG. 13 is a flow chart illustrating a process 1300 that can be used to train a tree rewriter to automatically learn the transfer function between two different types of tree structures, e.g., a tree of type A and a tree of type B.

As shown in FIG. 13, the first step 1301 is to generate a training set of input-output pairs of trees [$T_s$, $T_t$] and a mapping C between leaves each input-output tree pair. The input tree of the pair is of the type from which conversion is desired or, in other words, the source tree type $T_s$. The output tree of the pair is of the type to which conversion is desired or, in other words, the target tree type $T_t$.

The mapping C between leaves of an input tree and its paired output tree defines a correspondence between a source text segment and its counterpart target language translation. These mappings either can be generated manually as described below, or automatically, as described in Kevin Knight and Daniel Marcu, "Statistics-Based Summarization—Step One: Sentence Compression," The 17th National Conference on Artificial Intelligence (AAAI--2000), pp. 703-710, which is incorporated by reference.

Available types of mappings between leaves of a Japanese-English input-output pair that can be used are shown in equation (4) above, wherein j refers to a Japanese text segment and e refers to an English translation of that text segment. Note that the mappings represented by equation (4) are not limited to one-to-one mappings but rather can be any arbitrary mapping—that is, not only one-to-one, but also one-to-many, many-to-one and many-to-many. This flexibility in the mappings dramatically enhances the richness with which relationships between the input and output trees are defined, and further enhances the flexibility of the transfer function H[ ] that is automatically learned.

After the training set (input-output tree pairs and mappings therebetween) has been generated, the training process next determines in step 1303 the grouping and order of operations that generate a given output tree starting with its paired input tree. This step is performed based on the following seven basic operations, referred to collectively as the "extended shift-reduce" operations—shift, reduce, break, create-next, fuse, swap, and assignType—which are described in detail below under the section heading "The discourse-based transfer model." These seven operations are sufficient to rewrite any given input tree into its paired output tree.

The output of step 1303 is a set of learning cases—one learning case for each input-output tree pair in the training set. In essence, each learning case is an ordered set of extended shift-reduce operations that when applied to an input tree will generate the paired output tree.

Next, in step 1305, the tree rewriter training process 1300 associates features (e.g., operational and discourse features, correspondence-based features, and lexical features) with the learning cases to reflect the context in which the operations are to be performed. Details of step 1305 are discussed below under the heading "Learning the parameters of the discourse-transfer model."

Next, in step 1307, the tree rewriter training process 1300 applies a learning algorithm, for example, the C4.5 algorithm as described in J. Ross Quinlan, "C4.5: Programs for Machine Learning," Morgan Kaufmann Publishers (1993), to learn a set of decision rules from the learning cases. Details of step 1307 are discussed below under the heading "Learning the parameters of the discourse-transfer model." This set of decision rules collectively constitute the transfer function, $H(T_s \rightarrow T_t)$, for rewriting any tree of type $T_s$ into a tree of type $T_t$. This transfer function can then be used by users, applications or other automated processes for rewriting previously unseen trees of type $T_s$ into trees of type $T_t$.

A more detailed discussion of training a tree rewriter follows.

In order to learn to rewrite discourse structure trees, a related problem, defined below in Definition 3.1, is addressed.

Definition 3.1 Given two trees $T_s$ and $T_t$ and a correspondence Table C defined between $T_s$ and $T_t$ at the leaf level in terms of =, ⊂, ⊃, and ≅ reactions, find a sequence of actions that rewrites the tree $T_s$ into $T_t$.

If for any tuple $(T_s, T_t, C)$ such a sequence of actions can be derived, it is then possible to use a corpus of $(T_s, T_t, C)$ tuples in order to automatically learn to derive from an unseen tree $T_{s1}$, which has the same structural properties as the trees $T_s$, a tree $T_{t_1}$, which has structural properties similar to those of the trees $T_t$.

Solving the problem in definition 3.1 involves, in part, extending the shift-reduce parsing paradigm applied by Mangerman, "Statistical decision-tree models for parsing," In *Proc. Of ACL'95*, pages 276-283, Cambridge, Mass. (1995), Hermjakob et al., "Learning parse and translation decisions from examples with rich context," In *Proc. Of ACL'97*, pages 482-489, Madrid, Spain (1997), and Marcu, "A decision-based approach to rhetorical parsing," In *Proc. Of ACL'99*, pages 365-372, Maryland (1999). In this extended paradigm, the transfer process starts with an empty Stack and an Input List that contains a sequence of elementary discourse trees edts, one edt for each edu in the tree $T_s$ given as input. The status and rhetorical relation associated with each edt is undefined. At each step, the transfer module applies an operation that is aimed at building from the units in $T_s$ the discourse tree $T_t$. In the context of the discourse-transfer module, 7 types of operations are implemented:

SHIFT operations transfer the first edt from the input list into the stack;

REDUCE operations pop the two discourse trees located at the top of the stack; combine them into a new tee updating the statuses and rhetorical relation names of the trees involved in the operation; and push the new tree on the top of the stack. These operations are used to build the structure of the discourse tree in the target language.

BREAK operations are used in order to break the edt at the beginning of the input list into a predetermined number of units. These operations are used to ensure that the resulting tree has the same number of edts as $T_t$. For example, a BREAK operation is used whenever a Japanese edu is mapped into multiple English units.

CREATE-NEXT operations are used, for example, in order to create English (target language) discourse constituents that have no correspondent in the Japanese (source language) tree.

FUSE operations are used in order to fuse the edt at the top of the stack into the tree that immediately precedes it. These operations are used, for example, whenever multiple Japanese edus are mapped into one English edu.

SWAP operations swap the edt at the beginning of the input list with an edt found one or more positions to the right. These operations are used for re-ordering discourse constituents.

ASSIGNTYPE operations assign one or more of the following types to the tree t the top of the stack: Unit, MultiUnit, Sentence, Paragraph, MultiParagraph, and Text. These operations are used in order to ensure sentence and paragraph boundaries that are specific to the target language.

Figure 14A:
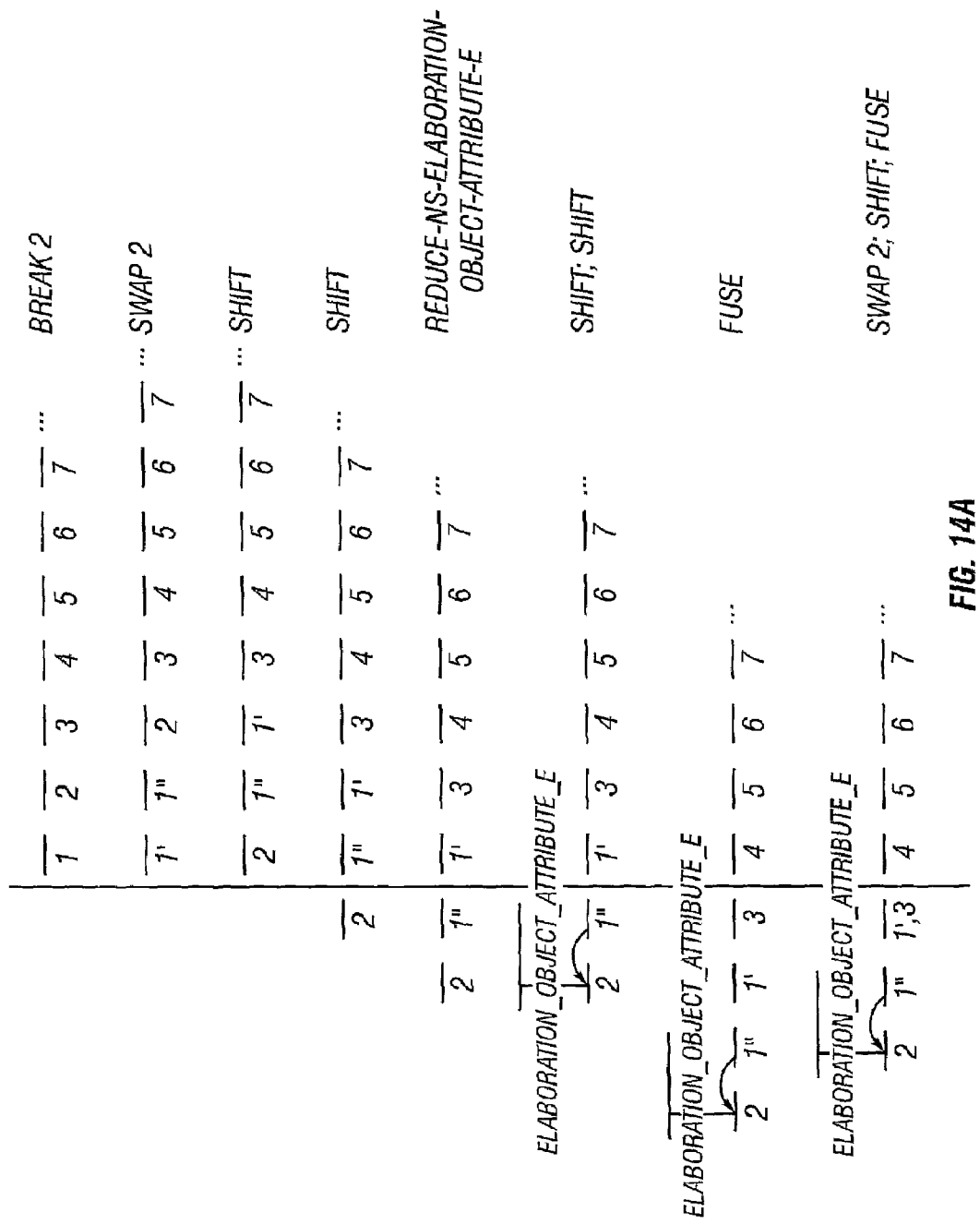
FIG. 14 shows an example of incremental tree reconstruction.
Figure 14B:
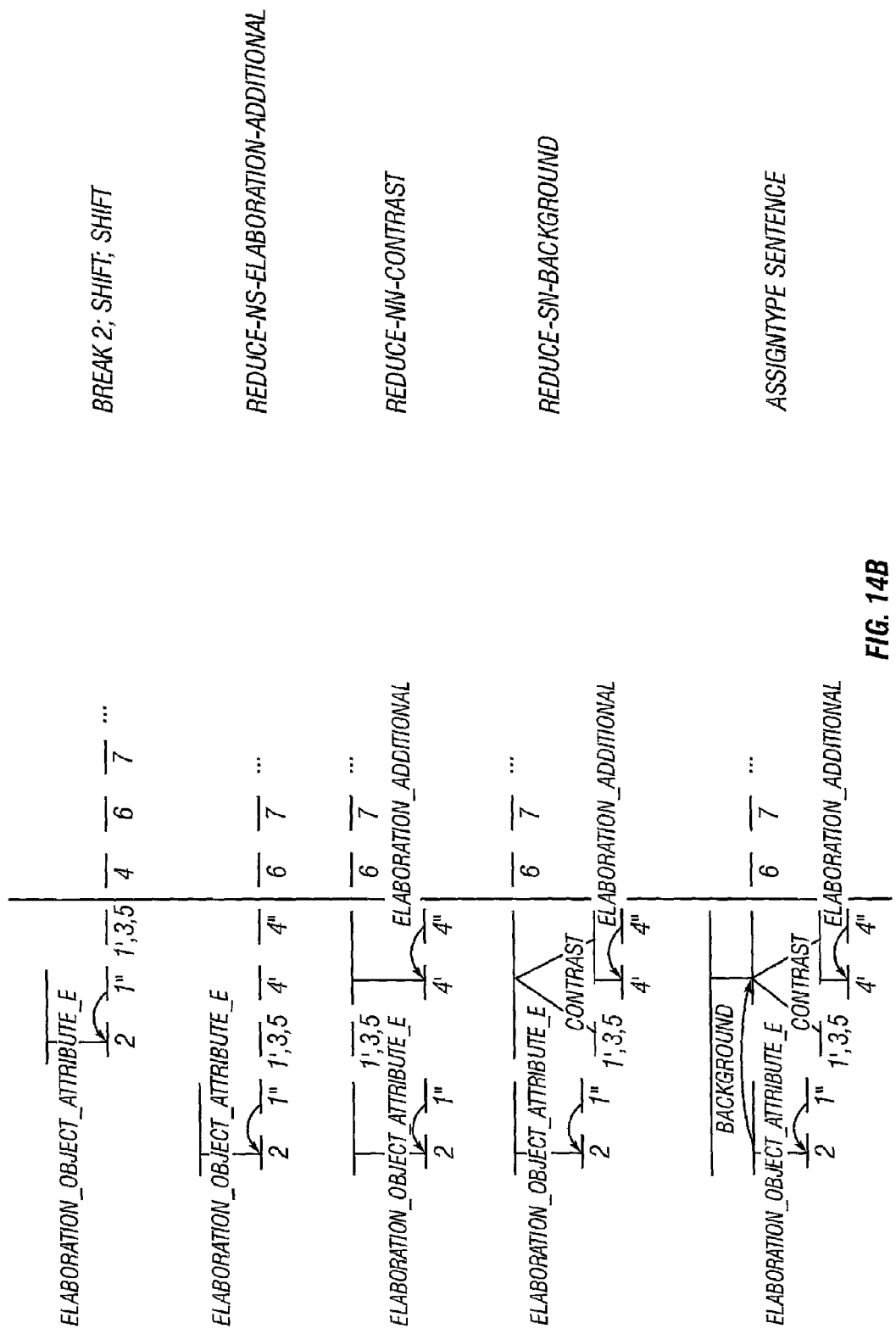

For example, the first sentence of the English tree in FIG. 9 can be obtained from the original Japanese sequence by following the sequence of actions (5), below, whose effects are shown in FIG. 14. For the purpose of compactness, FIG. 14 does not illustrate the effect of ASSIGNTYPE actions. For the same purpose, some lines correspond to more than one action.

(5) BREAK 2; SWAP 2; SHIFT; ASSIGNTYPE UNIT; SHIFT; REDUCE-NS-ELABORATION-OBJECT-ATTRIBUTE-E; ASSIGNTYPE MULTIUNIT; SHIFT; ASSIGNTYPE UNIT; SHIFT; ASSIGNTYPE UNIT; FUSE; ASSIGNTYPE UNIT; SWAP 2; SHIFT; ASSIGNTYPE UNIT; FUSE; BREAK 2; SHIFT; ASSIGNTYPE UNIT; SHIFT; ASSIGNTYPE UNIT; REDUCE-NS-ELABORATION-ADDITIONAL; ASSIGNTYPE MULTIUNIT; REDUCE-NS-CONTRAST; ASSIGNTYPE MULTIUNIT; REDUCE-SN-BACKGROUND; ASSIGNTYPE SENTENCE.

For the corpus used, in order to enable a discourse-based transfer module to derive any English discourse tree starting from any Japanese discourse tree, it is sufficient to implement:

one SHIFT operation;

3×2×85 REDUCE operations; (For each of the three possible pairs of nuclearity assignments NUCLEUS-SATELLITE (NS), SATELLITE-NUCLEUS (SN), AND NUCLEUS-NUCLEUS (NN), there are two possible ways to reduce two adjacent trees (one results in a binary tree, the other in a non-binary tree (Marcu, "A decision-based approach to rhetorical parsing," In *Proc. Of ACL'99*, pages 365-372, Maryland (1999)), and 85 relation names.);

three types of BREAK operations; (In the corpus used, a Japanese unit is broken into two, three, or at most four units.);

one type of CREATE-NEXT operation;

one type of FUSE operation;

eleven types of SWAP operations; (In the corpus, Japanese units are at most 11 positions away from their location in an English-specific rendering.)

seven types of ASSIGNTYPE operations: Unit, MultiUnit, Sentence, MultiSentence, paragraph, MultiParagraph, and Text.

These actions are sufficient for rewriting any tree $T_s$ into any tree $T_t$, where $T_t$ may have a different number of edus, where the edus of $T_t$ may have a different ordering than the edus of $T_s$, and where the hierarchical structures of the two trees may be different as well.

Learning the Parameters of the Discourse-transfer Model

Each configuration of the transfer model is associated with a learning case. The cases were generated by a program that automatically derived the sequence of actions that mapped the Japanese trees in the corpus into the sibling English trees, using the correspondences at the elementary unit level that were constructed manually. Overall, the 40 pairs of Japanese and English discourse trees yielded 14108 cases.

To each learning example, a set of features from the following classes was associated:

Operational and discourse features reflect the number of trees in the stack, the input list, and the types of the last five operations. They encode information pertaining to the types of the partial trees built up to a certain time and the rhetorical relations that hold between these trees.

Correspondence-based features reflect the nuclearity, rhetorical relations, and types of the Japanese trees that correspond to the English-like partial trees derived up to a given time.

Lexical features specify whether the Japanese spans that correspond to the structures derived up to a given time use potential discourse markers, such as dakara (because) and no ni (although).

The discourse transfer module uses the C4.5 program (Quinlan, C4.5: Programs for Machine Learning, Morgan Kaufmann Publishers (1993)) in order to learn decision trees and rules that specify how Japanese discourse trees should be mapped into English-like trees. A ten-fold cross-validation evaluation of the classifier yielded an accuracy of 70.2% (±0.21).

In order to better understand the strengths and weaknesses of the classifier, the problem was broken into smaller components. Hence, instead of learning all actions at once, it was determined first whether the rewriting procedure should choose a SHIFT, REDUCE, BREAK, FUSE, SWAP, or ASSIGNTYPE operation (the "Main Action Type" classifier in table 3), and only then to refine this decision by determining what type of reduce operation to perform how many units to break a Japanese units into, how big the distance to the SWAP-ed unit should be, and what type of ASSIGNTYPE operation one should perform. Table 3 below shows the sizes of each data set and the performance of each of these classifiers, as determined using a ten-fold cross-validation procedure. For the purpose of comparison, each classifier is paired with a majority baseline.

TABLE 3

Performance of the classifiers

| Classifier | # Cases | Accuracy (10-fold cross validation) | Majority baseline accuracy |
|---|---|---|---|
| General (Learns all classes at once) | 14108 | 70.20% (±0.21) | 22.05% (on ASSIGNTYPE UNIT) |
| Main Action Type | 14108 | 82.53% (±0.25) | 45.47% (on ASSIGNTYPE) |
| Assign Type | 6416 | 90.46% (±0.39) | 57.30% (on ASSIGNTYPE Unit) |
| Break | 394 | 82.91% (±1.40) | 82.91% (on BREAK 2) |
| Nuclearity-Reduce | 2388 | 67.43% (±1.03) | 50.92% (on NS) |
| Relation-Reduce | 2388 | 48.20% (±1.01) | 17.18% (on ELABORATION-OBJECT-ATTRIBUTE-E) |
| Swap | 842 | 62.98% (±1.62) | 62.98% (on SWAP1) |

The results in Table 3 show that the most difficult subtasks to learn are that of determining the number of units a Japanese unit should be broken into and that of determining the distance to the unit that is to be swapped. The features used are not able to refine the baseline classifiers for these action types. The confusion matrix for the "Main Action Type" classifier (see Table 4) shows that the system has trouble mostly identifying BREAK and CREATE-NEXT actions. The system has difficulty learning what type of nuclearity ordering to prefer (the "Nuclearity-Reduce" classifier) and what relation to choose for the English-like structure (the "Relation-Reduce" classifier)

TABLE 4

Confusion matrix for the Main Action Type classifier

| Action | (a) | (b) | (c) | (d) | (e) | (f) | (g) |
|---|---|---|---|---|---|---|---|
| ASSIGNTYPE (a) | 660 | | | | | | |
| BREAK (b) | | 1 | | | 2 | 28 | 1 |
| CREATE-NEXT (c) | | | | | 1 | 8 | |
| FUSE (d) | | | | 69 | 8 | 3 | |
| REDUCE (e) | | 4 | | 18 | 193 | 30 | 3 |
| SHIFT (f) | 1 | 4 | | 15 | 44 | 243 | 25 |
| SWAP (g) | | 3 | | 4 | 14 | 43 | 25 |

Figure 15:
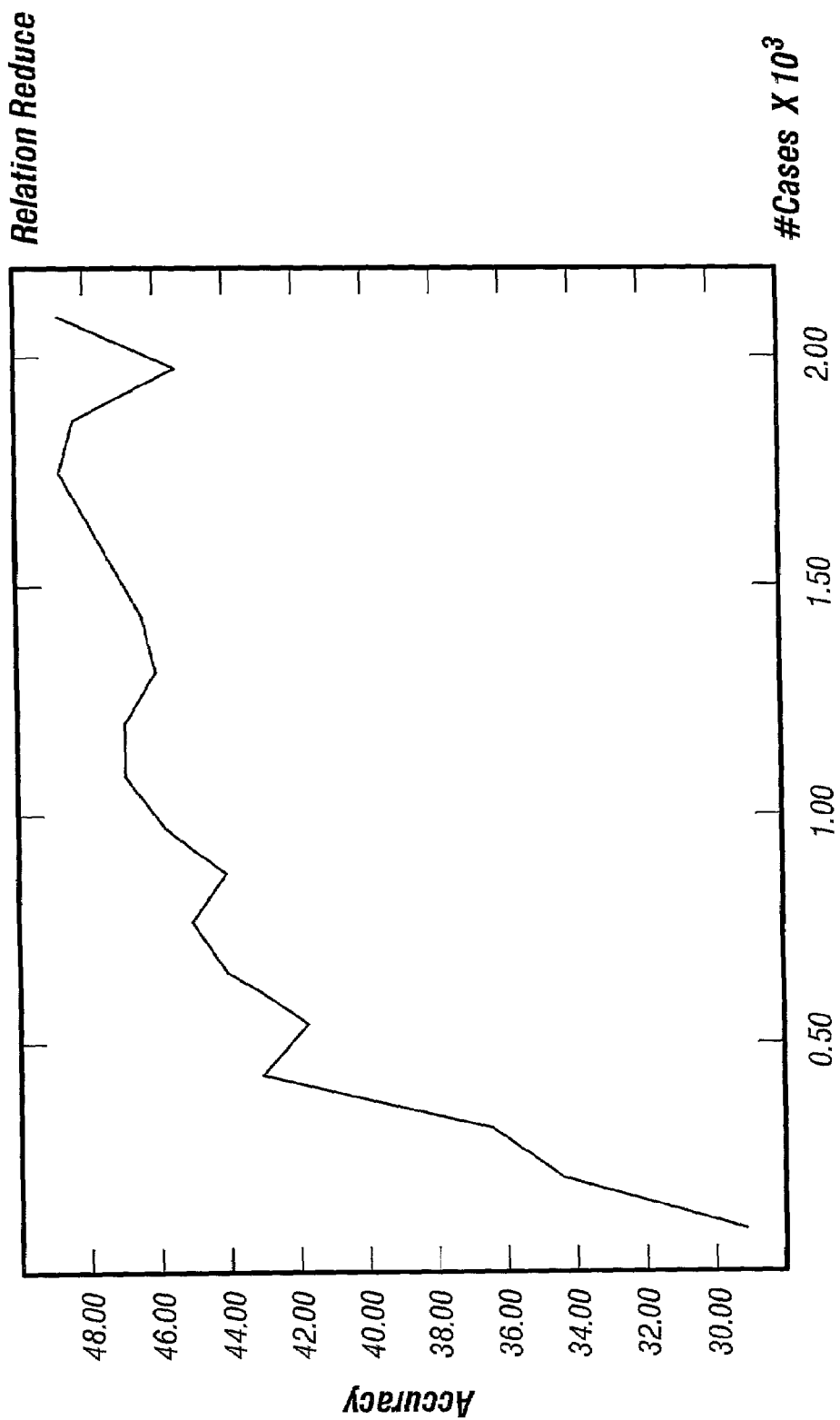
FIG. 15 is a graph of the learning curve for the Relation-Reduce classifier.

FIG. 15 shows a typical learning curve, the one that corresponds to the "Reduce Relation" classifier. The learning curves suggest that more training data may improve performance. However, they also suggest that better features may be needed in order to improve performance significantly.

Table 5 below displays some learned rules. The first rule accounts for rhetorical mappings in which the order of the nucleus and satellite of an ATTRIBUTION relation is changed when translated from Japanese into English. The second rule was learned in order to map EXAMPLE Japanese satellites into EVIDENCE English satellites.

if rhetRelOfStack−1InJapTree=ATTRIBUTION
   then rhetlOfTopStackInEngTree ATTRIBUTION
if       rhetRelOfTopStackInJapTree=EXAMPLE
  ^isSentenceTheLastUnitinJapTreeOfTopStack=false
   then rhetRelOfTopStackInEngTree EVIDENCE Table 5: Rule examples for the Relation-Reduce classifier Evaluation of the Discourse-based Transfer Module By applying the General classifier or the other six classifiers successively, one can map any Japanese discourse tree into a tree whose structure comes closer to the natural rendering of English. To evaluate the discourse-based transfer module, a ten-fold cross-validation experiment was performed. That is, the classifiers were trained on 36 pairs of manually built and aligned discourse structures, and then the learned classifiers were used in order to map 4 unseen Japanese discourse trees into English-like trees. The similarity of the derived trees and the English trees built manually was measured using the metrics discussed above. This procedure was repeated ten times, each time training and testing on different subsets of tree pairs.

The results reported in Table 2 were as a baseline for the model. The baseline corresponds to applying no knowledge of discourse. Table 6 below displays the absolute improvement (in percentage points) in recall and precision figures obtained when the General classifier was used to map Japanese trees into English-looking trees. The General classifier yielded the best results. The results in Table 6 are averaged over a ten-fold cross-validation experiment.

TABLE 6

Relative evaluation of the discourse-based transfer module with respect to the figures in Table 2

| Level | Units | | Spans | | Status/Nuclearity | | Relations | |
|---|---|---|---|---|---|---|---|---|
| | P-D R | P-D P | P-D R | P-D P | P-D R | P-D P | P-D R | P-D P |
| Sentence | +9.1 | +25.5 | +2.0 | +19.9 | +0.4 | +13.4 | −0.01 | +8.4 |
| Paragraph | −14.7 | +1.4 | −12.5 | −1.7 | −11.0 | −2.4 | −9.9 | −3.3 |
| Text | −9.6 | −13.5 | −7.1 | −11.1 | −6.3 | −10.0 | −5.2 | −8.8 |
| Weighted Average | +1.5 | +14.1 | −2.1 | +9.9 | −3.1 | +6.4 | −3.0 | +3.9 |
| All | −1.2 | +2.5 | −0.1 | +2.9 | +0.6 | +3.5 | +0.7 | +2.6 |
| | P-I R | P-I P | P-I R | P-I P | P-I R | P-I P | P-I R | P-I P |
| Sentence | +13.4 | +30.4 | +3.1 | +36.1 | −6.3 | +18.6 | −10.1 | +3.9 |
| Paragraph | −15.6 | +0.6 | −13.5 | −0.8 | −11.7 | −1.8 | −10.3 | −2.9 |
| Text | −15.4 | −23.3 | −13.0 | −20.4 | −13.2 | −19.5 | −11.5 | −17.0 |
| Weighted Average | +3.6 | +15.5 | −2.7 | +17.1 | −8.5 | +7.3 | −10.5 | −0.4 |
| All | +12.7 | +29.6 | +2.0 | +28.8 | −5.1 | +13.0 | −7.9 | +2.2 |

The results in Table 6 show that the model described here outperforms the baseline with respect to building English-like discourse structures for sentences, but it under-performs the baseline with respect to building English-like structures at the paragraph and text levels. One potential shortcoming of this model seems to come from its low performance in assigning paragraph boundaries. Because the classifier does not learn correctly which spans to consider paragraphs and which spans not, the recall and precision results at the paragraph and text levels are negatively affected. The poorer results at the paragraph and text levels can be also explained by errors whose effect cumulates during the step-by-step tree-reconstruction procedure; and by the fact that, for these levels, there is less data to learn from.

However, if one ignores the sentence and paragraph boundaries and evaluates the discourse structures overall, one can see that this model outperforms the baseline on all accounts according to the Position-Dependent evaluation; outperforms the baseline with respect to the assignment of elementary units, hierarchical spans, and nuclearity statuses according to the Position-Independent evaluation and under-performs the baseline only slightly with respect to the rhetorical relation assignment according to the Position-Independent evaluation. More sophisticated discourse features, such as those discussed by Maynard, *Principles of Japanese Discourse: A Handbook*, Cambridge Univ. Press (1998), for example, and a tighter integration with the lexicogrammar of the two languages may yield better cues for learning discourse-based translation models.

Alternative embodiments of the tree rewriter are possible. For example, probabilities could be incorporated into the tree rewriting procedure. Alternatively, or in addition, multiple trees could be rewritten in parallel and the best one selected in the end. In the current embodiment, the target tree $T_t$ is generated in a sequence of deterministic steps with no recursion or branching. Alternatively, it is possible to associate a probability with each individual step and reconstruct the target tree $T_t$ by exploring multiple alternatives at the same time. The probability of a target tree $T_t$ is given by the product of the probabilities of all steps that led to that tree. In this case, the target tree $T_t$ will be taken to be the resulting tree of maximum probability. An advantage of such an approach is that it enables the learning of probabilistic transfer functions, H[ ].

Although only a few embodiments have been described in detail above, those having ordinary skill in the art will certainly understand that many modifications are possible in the preferred embodiment without departing from the teachings thereof. All such modifications are encompassed within the following claims.

What is claimed is:

1. A machine translation decoding method comprising:
   receiving as input a text segment in a source language to be translated into a target language;
   generating an initial translation as an initial current target language translation;
   estimating a probability of correctness of the initial translation, the probability based on alignment links between words and phrases in the source language and words and phrases in the target language;
   applying one or more modification operators to the initial current target language translation by a computer to generate one or more modified target language translations;
   estimating a probability of correctness of the one or more modified target language translations, the probability based on alignment links between words and phrases in the source language and words and phrases in the target language;
   determining by the computer whether one or more of the modified target language translations represents an improved translation in comparison with the initial current target language translation by comparing the estimated probability of correctness of the initial translation with the estimated probability of correctness of the one or more modified target language translations;
   setting by the computer a modified target language translation with a higher probability based on the comparison as the modified current target language translation; and
   repeating said applying, said determining and said setting for the modified current target language translation until occurrence of a termination condition and
   outputting the modified current target language translation by the computer in response to the occurrence of the termination condition.

2. The method of claim 1 wherein the text segment comprises a clause, a sentence, a paragraph or a treatise.

3. The method of claim 1 wherein generating an initial translation comprises generating a gloss.

4. The method of claim 3 wherein the gloss is a word-for-word gloss or a phrase-for-phrase gloss.

5. The method of claim 1 wherein applying one or more modification operators comprises changing in the initial current target language translation the translation of one or two words.

6. The method of claim 1 wherein applying one or more modification operators comprises (i) changing in the initial current target language translation a translation of a word and concurrently (ii) inserting another word at a position that yields an alignment of highest probability between the source language text segment and the initial current target language translation, the inserted other word having a substantial probability of having a zero-value fertility.

7. The method of claim 1 wherein applying one or more modification operators comprises deleting from the initial current target language translation a word having a zero-value fertility.

8. The method of claim 1 wherein applying one or more modification operators comprises modifying an alignment between the source language text segment and the initial current target language translation by swapping non-overlapping target language word segments in the initial current target language translation.

9. The method of claim 1 wherein applying one or more modification operators comprises modifying an alignment between the source language text segment and the initial current target language translation by (i) eliminating a target language word from the initial current target language translation and (ii) linking words in the source language text segment.

10. The method of claim 1 wherein applying one or more modification operators comprises applying two or more of the following: (i)
changing in the initial current target language translation the translation of one or two words; (ii) changing in the initial current target language translation a translation of a word and concurrently inserting another word at a position that yields an alignment of highest probability between the source language text segment and the initial current target language translation, the inserted other word having a high probability of having a zero-value fertility; (iii) deleting from the initial current target language translation a word having a zero-value fertility; (iv) modifying an alignment between the source language text segment and the initial current target language translation by swapping non-overlapping target language word segments in the initial current target language translation; and (v) modifying an alignment between the source language text segment and the initial current target language translation by eliminating a target language word from the initial current target language translation and linking words in the source language text segment.

11. The method of claim 1 wherein estimating a probability of correctness of the one or more modified target language translations comprises calculating a probability of correctness for each of the one or more modified target language translations.

12. The method of claim 1 wherein the termination condition comprises a determination that a probability of correctness of a modified target language translation is no greater than a probability of correctness of the initial current target language translation.

13. The method of claim 1 wherein the termination condition comprises a completion of a predetermined number of iterations.

14. The method of claim 1 wherein the termination condition comprises a lapse of a predetermined amount of time.

15. A computer-implemented machine translation decoding method comprising:
receiving as input a text segment in a source language to be translated into a target language;
generating an initial translation by the computer as an initial current target language translation;
estimating a probability of correctness of the initial translation by the computer, the probability based on alignment links between words and phrases in the source language and words and phrases in the target language;
applying one or more modification operators by the computer to the initial current target language translation to generate one or more modified target language translations;
estimating a probability of correctness of the one or more modified target language translations, the probability based on alignment links between words and phrases in the source language and words and phrases in the target language;
determining by the computer whether one or more of the modified target language translations represents an improved translation in comparison with the initial current target language translation by comparing the estimated probability of correctness of the initial translation with the estimated probability of correctness of the one or more modified target language translations;
iteratively modifying the current target language translation of the source language text segment based on the determination; and
repeating said applying, said determining and said iteratively modifying until occurrence of a termination condition.

16. The method of claim 15 wherein the termination condition comprises a determination that a probability of correctness of a modified translation is no greater than a probability of correctness of a previous translation.

17. The method of claim 15 wherein the termination condition comprises a completion of a predetermined number of iterations.

18. The method of claim 15 wherein the source language text segment comprises a clause, a sentence, a paragraph, or a treatise.

19. The method of claim 15 wherein the method starts with an approximate target language translation and iteratively improves the translation with each successive iteration.

20. The method of claim 19 wherein the approximate target language translation comprises a gloss.

21. The method of claim 20 wherein the gloss comprises a word-for-word gloss or a phrase-for-phrase gloss.

22. The method of claim 19 wherein the approximate target language translation comprises a predetermined translation selected from among a plurality of predetermined translations.

23. The method of claim 15 wherein the method implements a greedy algorithm.

24. The method of claim 15 wherein iteratively modifying the translation comprises incrementally improving the translation with each iteration.

25. The method of claim 15 wherein iteratively modifying the translation comprises performing at each iteration one or more modification operations on the translation.

26. The method of claim 25 wherein the one or more modification operations comprises one or more of the following operations: (i) changing one or two words in the translation; (ii) changing a translation of a word and concurrently inserting another word at a position that yields an alignment of highest probability between the source language text segment and the translation, the inserted other word having a high probability of having a zero-value fertility; (iii) deleting from the translation a word having a zero-value fertility; (iv) modifying an alignment between the source language text segment and the translation by swapping non-overlapping target language word segments in the translation; and (v) modifying an alignment between the source language text segment and the translation by eliminating a target language word from the translation and linking words in the source language text segment.

27. A machine translation decoder comprising:
- a memory, the memory containing program instructions configured to be executed by a processor;
- a processor able to access and execute the program instructed stored in the memory;
- a decoding engine, configured to receive as input a text segment in a source language to be translated into a target language and to generate an initial translation as a current target language translation, comprising one or more modification operators to be applied to a current target language translation to generate one or more modified target language translations;
- a probability module in communication with the decoding engine configured to estimate a probability of correctness of the initial translation, the probability based on alignment links between words and phrases in the source language and words and phrases in the target language, to estimate a probability of correctness of the one or more modified target language translations, the probability based on alignment links between words and phrases in the source language and words and phrases in the target language, and to determine whether one or more of the modified target language translations represents an improved translation in comparison with the initial current target language translation by comparing the estimated probability of correctness of the initial translation with the estimated probability of correctness of the one or more modified target language translations; and
- a process loop configured to iteratively modify the current target language translation of a source language text based on the probability module estimate of the probability of correctness of the one or more modified target language translations and the probability module determination regarding whether one or more of the modified target language translations represent an improved translation, the process loop terminating upon occurrence of a termination condition.

28. The decoder of claim 27 wherein the process loop controls the decoding engine to incrementally improve the current target language translation with each iteration.

29. The decoder of claim 27 further comprising a module for determining a probability of correctness for a translation.

30. The decoder of claim 29 wherein the probability module for determining a probability of correctness comprises a language model and a translation module.

31. The decoder of claim 29 wherein the process loop terminates upon a determination that a probability of correctness of a modified translation is no greater than a probability of correctness of a previous translation.

32. The method of claim 27 wherein the process loop terminates upon completion of a predetermined number of iterations.

33. The decoder of claim 27 wherein the one or more modification operators comprise one or more of the following: (i) an operator to change in the current target language translation the translation of one or two words; (ii) an operator to change in the current target language translation a translation of a word and to concurrently insert another word at a position that yields an alignment of highest probability between the source language text segment and the current target language translation, the inserted other word having a high probability of having a zero-value fertility; (iii) an operator to delete from the current target language translation a word having a zero-value fertility; (iv) an operator to modify an alignment between the source language text segment and the current target language translation by swapping non-overlapping target language word segments in the current target language translation; and (v) an operator to modify an alignment between the source language text segment and the current target language translation by eliminating a target language word from the current target language translation and linking words in the source language text segment.

* * * * *